United States Patent
Reis et al.

(10) Patent No.: US 10,116,893 B1
(45) Date of Patent: Oct. 30, 2018

(54) SELECTIVELY CONTROLLING A DIRECTION OF SIGNAL TRANSMISSION USING ADAPTIVE AUGMENTED REALITY

(71) Applicant: Higher Ground LLC, Palo Alto, CA (US)

(72) Inventors: Robert S. Reis, Palo Alto, CA (US); Shmuel Shaffer, Palo Alto, CA (US); Bruce L. McKinley, South Riding, VA (US)

(73) Assignee: HIGHER GROUND LLC, Palo Alto, CA (US)

( * ) Notice: Subject to any disclaimer, the term of this patent is extended or adjusted under 35 U.S.C. 154(b) by 2 days.

(21) Appl. No.: 15/611,022

(22) Filed: Jun. 1, 2017

Related U.S. Application Data

(63) Continuation-in-part of application No. 15/581,419, filed on Apr. 28, 2017.

(51) Int. Cl.
*H04N 5/445* (2011.01)
*G01S 3/20* (2006.01)
(Continued)

(52) U.S. Cl.
CPC .......... *H04N 5/44504* (2013.01); *G01S 3/20* (2013.01); *H01Q 3/08* (2013.01); *H04B 7/195* (2013.01); *H04N 5/23293* (2013.01)

(58) Field of Classification Search
CPC .... H04N 5/44504; H01Q 1/1257; G01S 3/20; G01S 3/16
See application file for complete search history.

(56) References Cited

U.S. PATENT DOCUMENTS 6,285,338 B1    9/2001    Bai et al.
6,937,188 B1    8/2005    Saunders et al.
(Continued)

OTHER PUBLICATIONS

Analytical Graphics, Inc., Satellite AR (Version 2.4), Sep. 22, 2011, [Mobile Application Software], Retrieved from https://play.google.com/store/apps/details?id=com.agi.android.augmentedreality&hl=en.
(Continued)

*Primary Examiner* — Nicholas G Giles
(74) *Attorney, Agent, or Firm* — The Mueller Law Office, P.C.

(57) ABSTRACT

A communication device, having an antenna, determines a direction substantially in a direction to an intended transceiver. A desired direction that is different from the direction to the intended transceiver, and an anticipated direction that is offset from the desired direction, are determined. Based on the desired direction, parameters of expected energy values corresponding to a multiple pre-defined antenna directions of the antenna around the desired direction are determined. The communication device receives, using the antenna, multiple measured energy values corresponding to multiple antenna directions of the antenna around the anticipated direction. A directional offset is calculated using the multiple expected energy parameters and the multiple measured energy values. An updated anticipated direction is generated by updating the anticipated direction using the calculated directional offset. Steps of receiving measured energy values through generating an updated anticipated direction are repeated using the updated anticipated direction as the anticipated direction.

20 Claims, 33 Drawing Sheets

(51) Int. Cl.
*H01Q 3/08* (2006.01)
*H04B 7/195* (2006.01)
*H04N 5/232* (2006.01)

(56) References Cited

U.S. PATENT DOCUMENTS

| | | | |
|---|---|---|---|
| 9,548,790 B1 | 1/2017 | McKinley | |
| 2008/0284669 A1* | 11/2008 | Hunton | H01Q 1/22 343/757 |
| 2009/0033576 A1* | 2/2009 | Smoyer | H01Q 1/125 343/761 |
| 2010/0194641 A1* | 8/2010 | Miller | G01S 5/04 342/417 |
| 2013/0135146 A1* | 5/2013 | Ransom | G01S 19/23 342/357.36 |
| 2013/0271319 A1* | 10/2013 | Trerise | H01Q 1/125 342/359 |
| 2014/0113681 A1 | 4/2014 | Reis et al. | |
| 2015/0263408 A1* | 9/2015 | Hirabe | H01Q 1/1228 343/894 |
| 2016/0308601 A1* | 10/2016 | Mochida | H01Q 1/1257 |
| 2016/0374047 A1 | 12/2016 | Reis | |
| 2017/0005697 A1 | 1/2017 | McDermott | |
| 2017/0006620 A1 | 1/2017 | Reis | |
| 2017/0045623 A1* | 2/2017 | Zlogar | G01S 3/14 |
| 2017/0179566 A1* | 6/2017 | Hirabe | H01Q 1/1257 |

OTHER PUBLICATIONS

Dishpointer, Augmented Reality App—the Next Generation Satellite Finder, Aug. 2009, Accessed May 22, 2017, http://www.dishpointer.com/2009/augmented-reality-satellite-finder/.

Gawronski and Craparo, Antenna Scanning Techniques for Estimation of Spacecraft Position, Proceedings, IEEE Aerospace Conference, 2002, pp. 2-939-2-948 vol. 2., Dec. 6, 2002.

Karol and Ristroph, Improving Conical Scanning for Satellite Tracking On-The-Move, Pasadena, CA, 2012, 7 pages, last modified Nov. 22, 2013, http://authors.library.caltech.edu/42630/1/Karol_2012.pdf.

Marsh, Inertially Stabilized Platforms for SATCOM On-The-Move Applications: A Hybrid Open/Closed-Loop Antenna Pointing Strategy, Massachusetts Institute of Technology, Department of Aeronautics and Astronautics, Jun. 6, 2008, 217 pages.

* cited by examiner

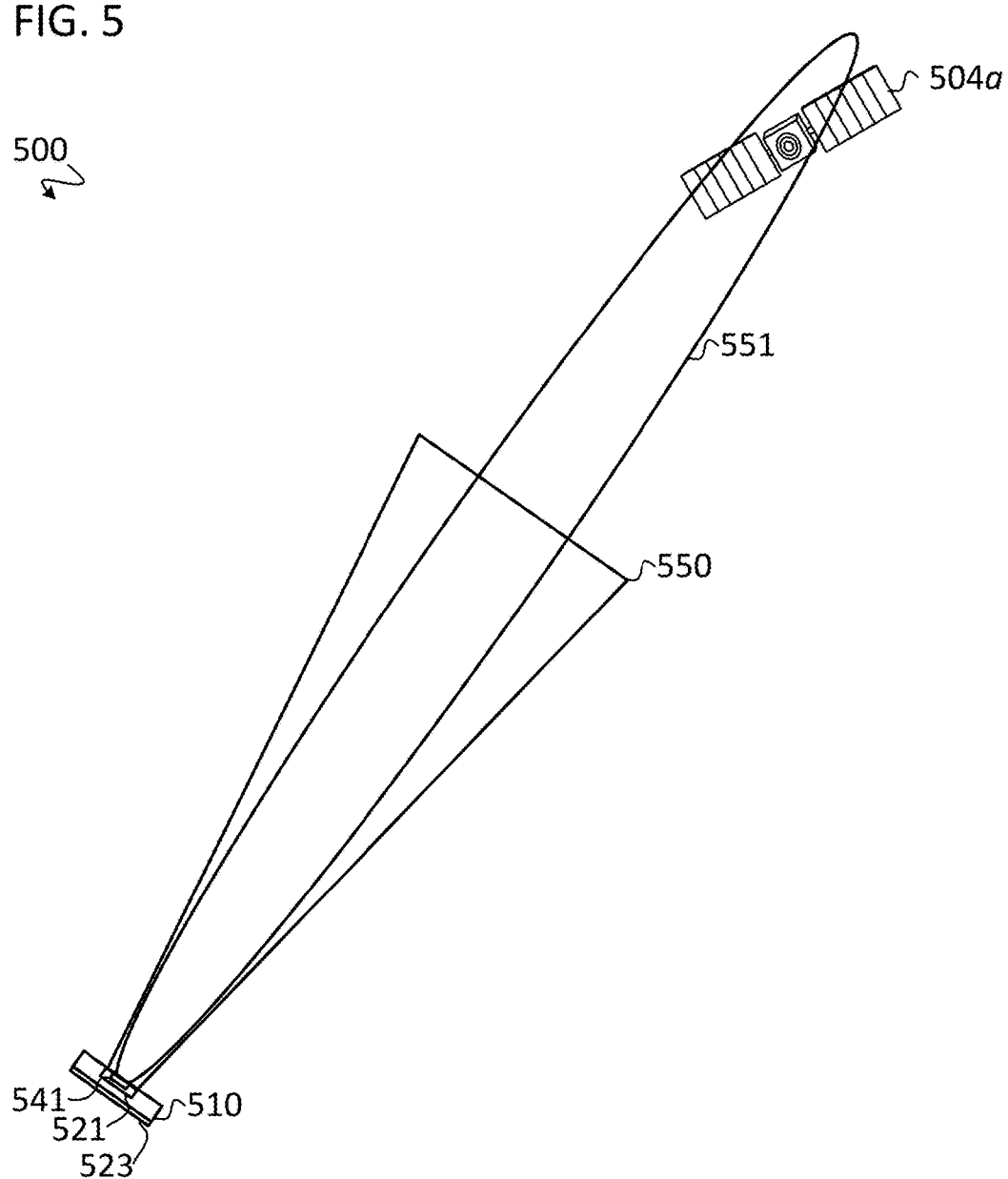

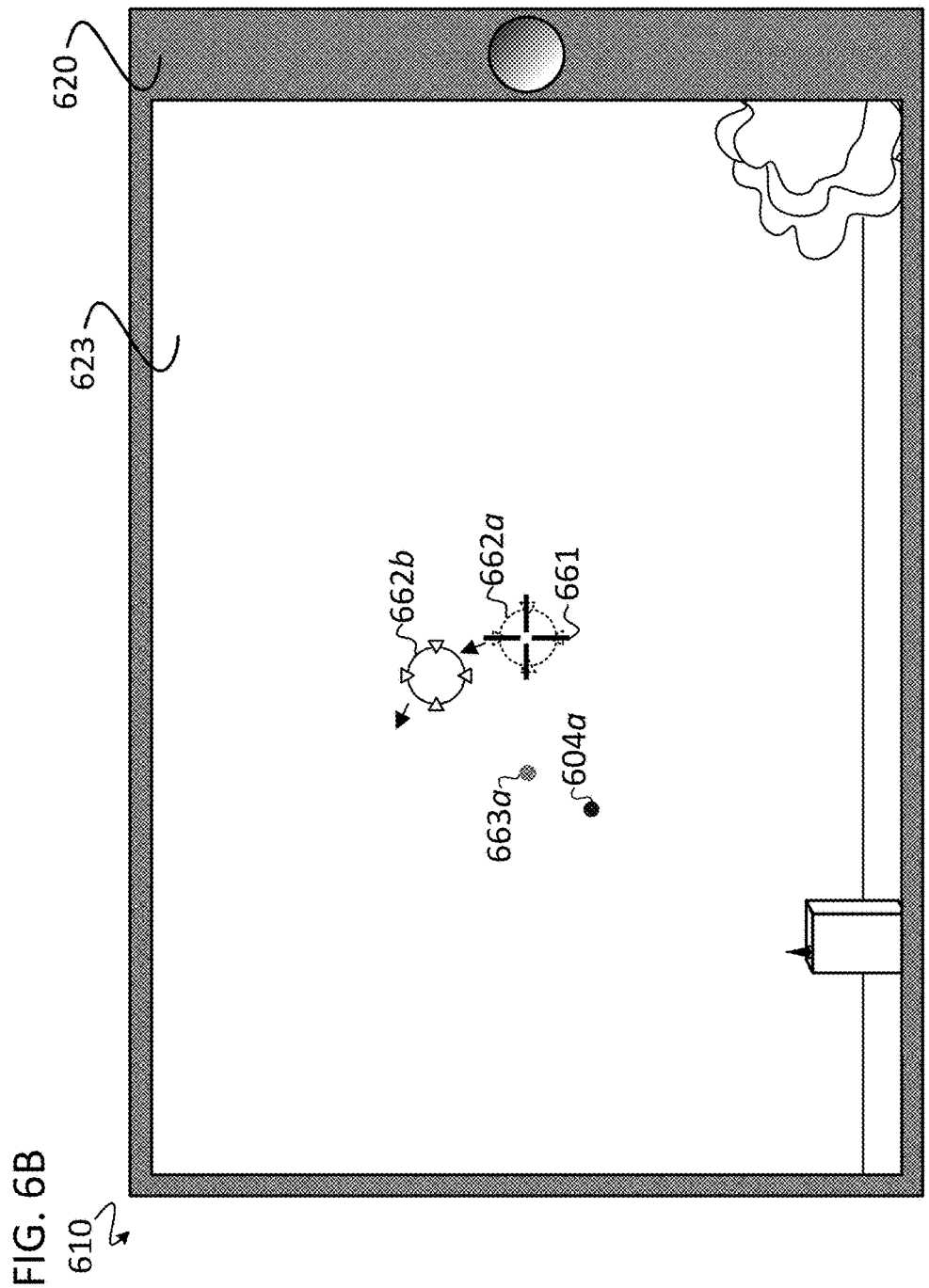

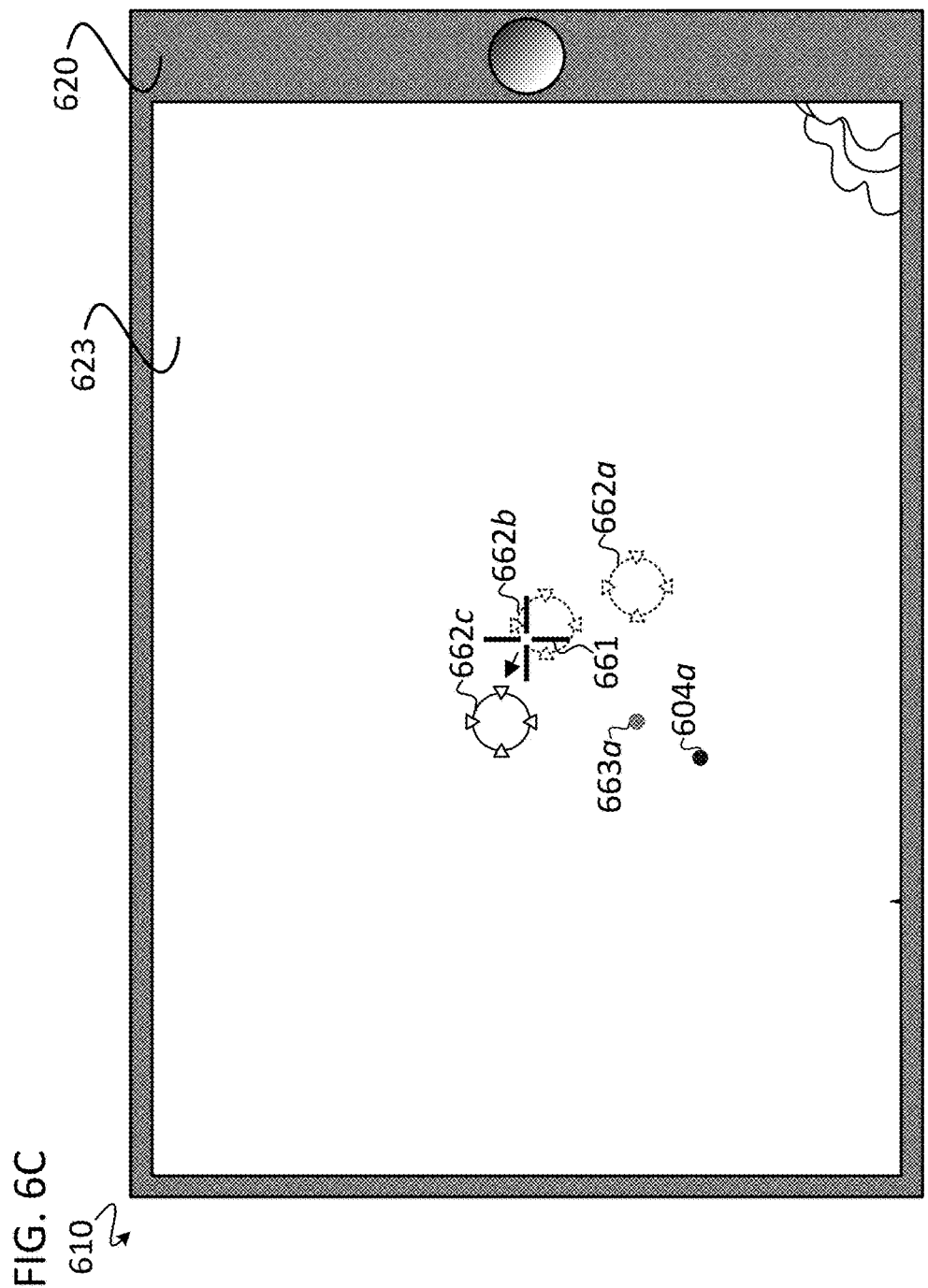

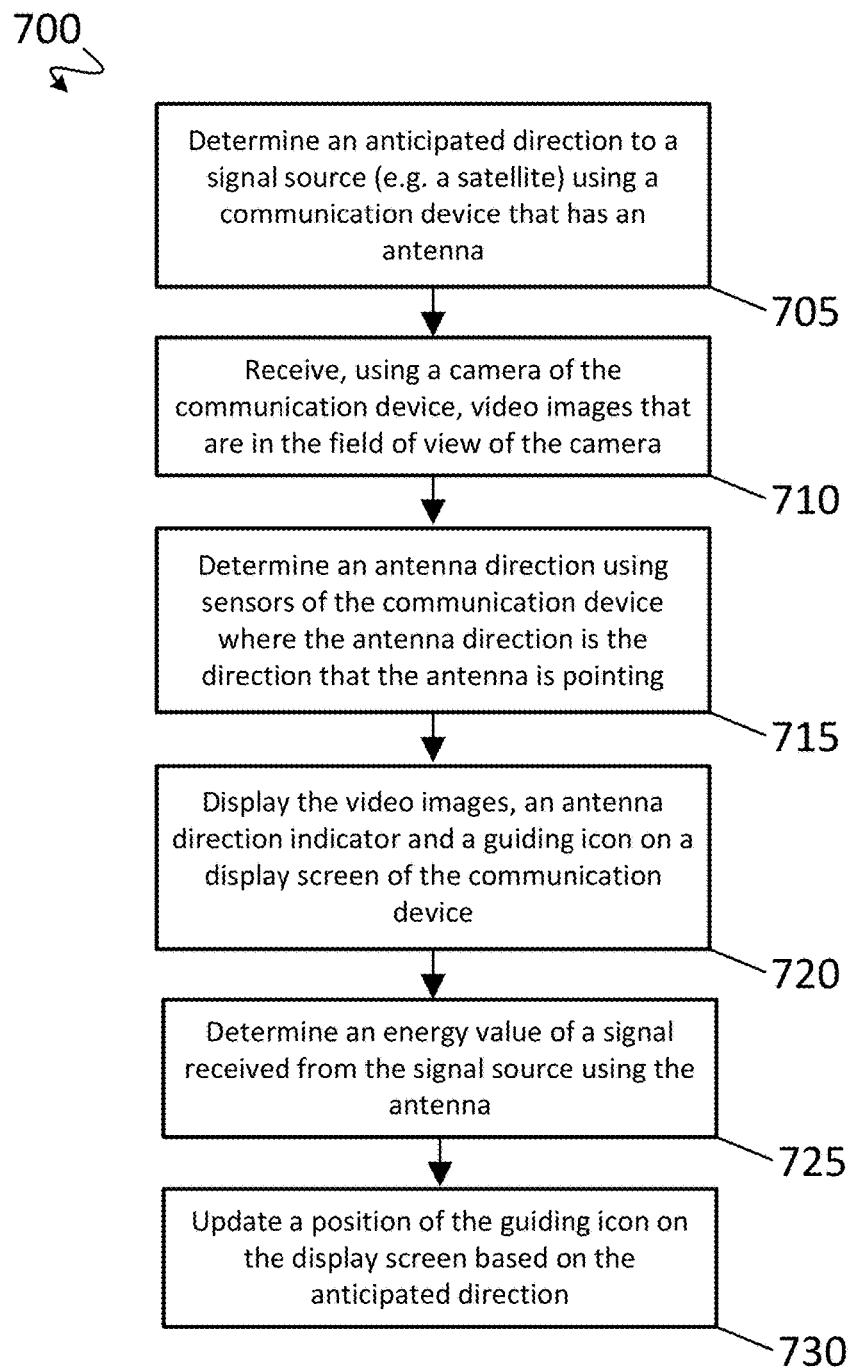

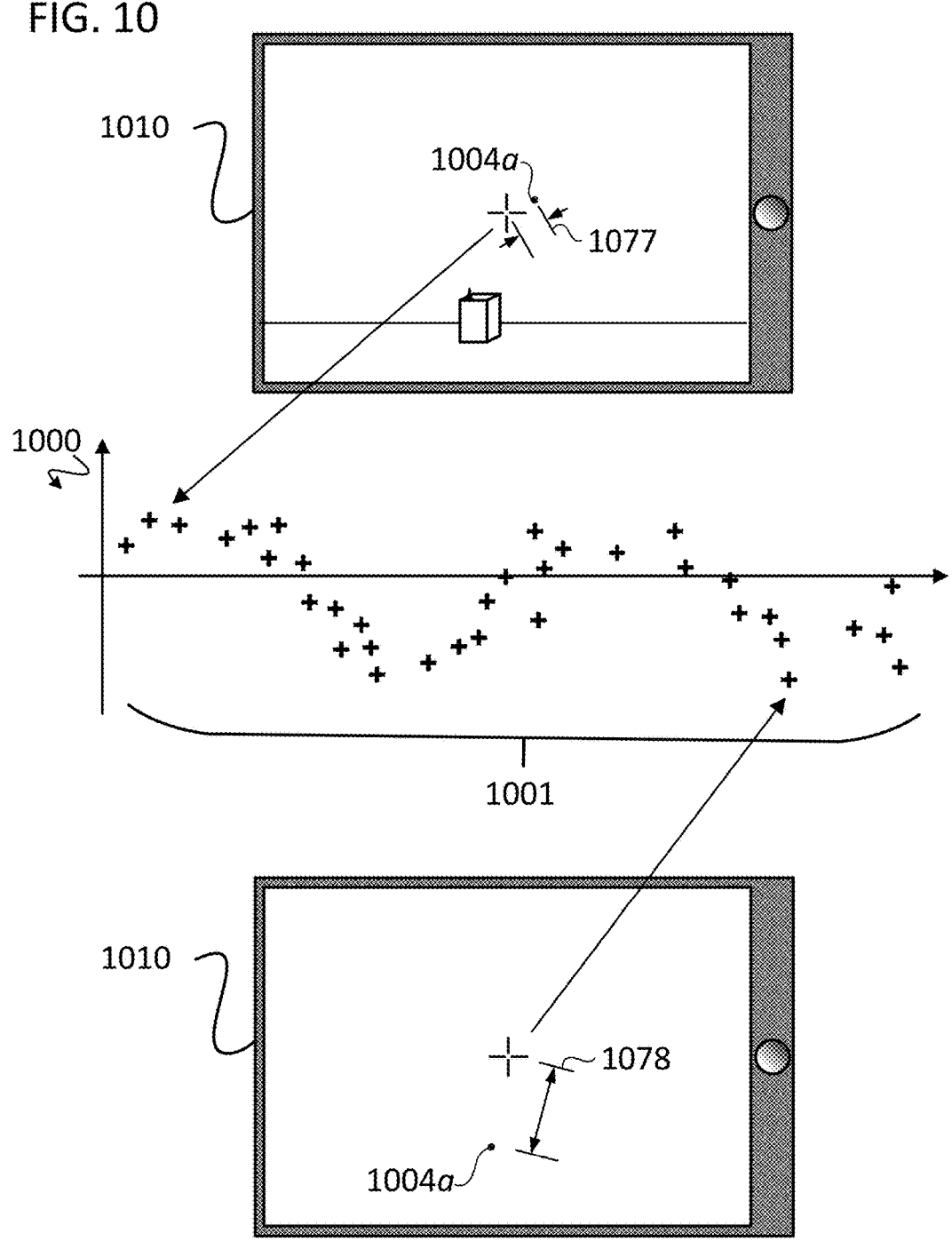

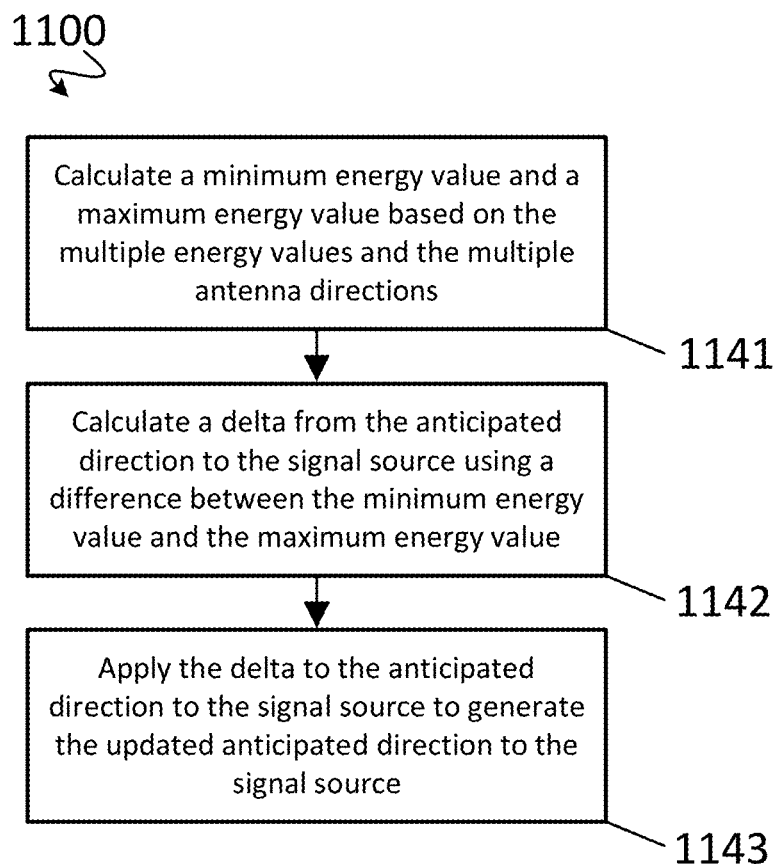

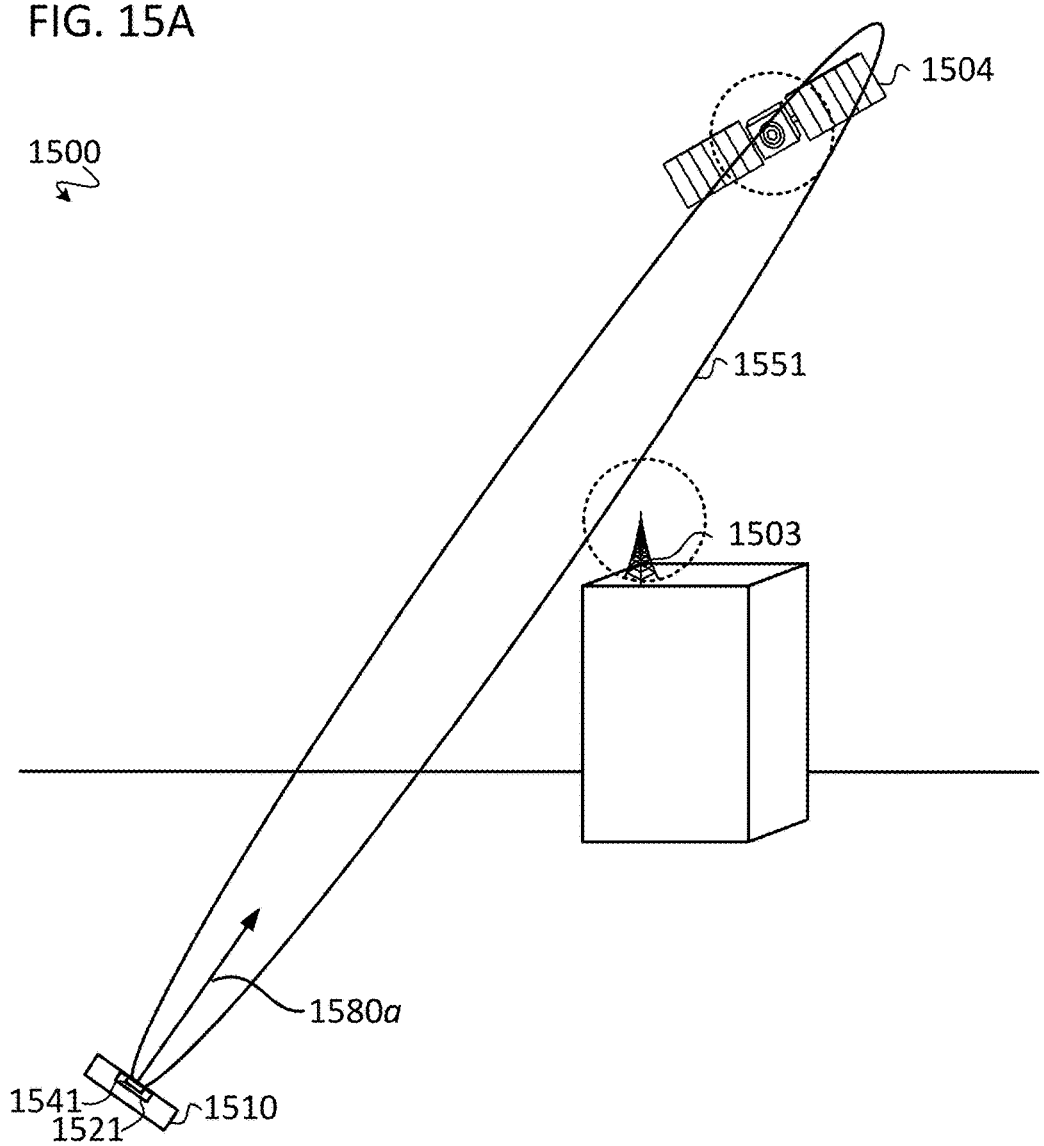

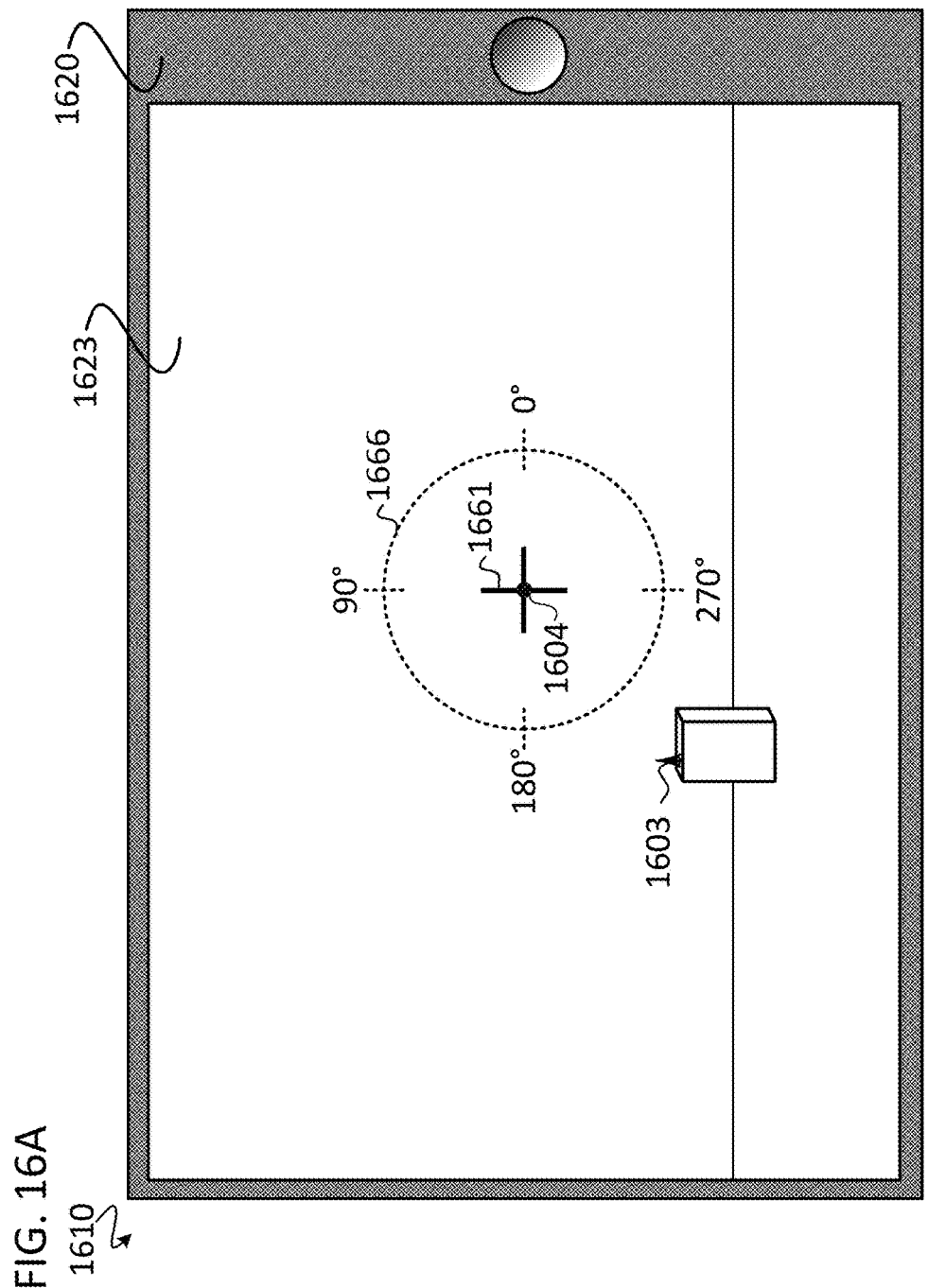

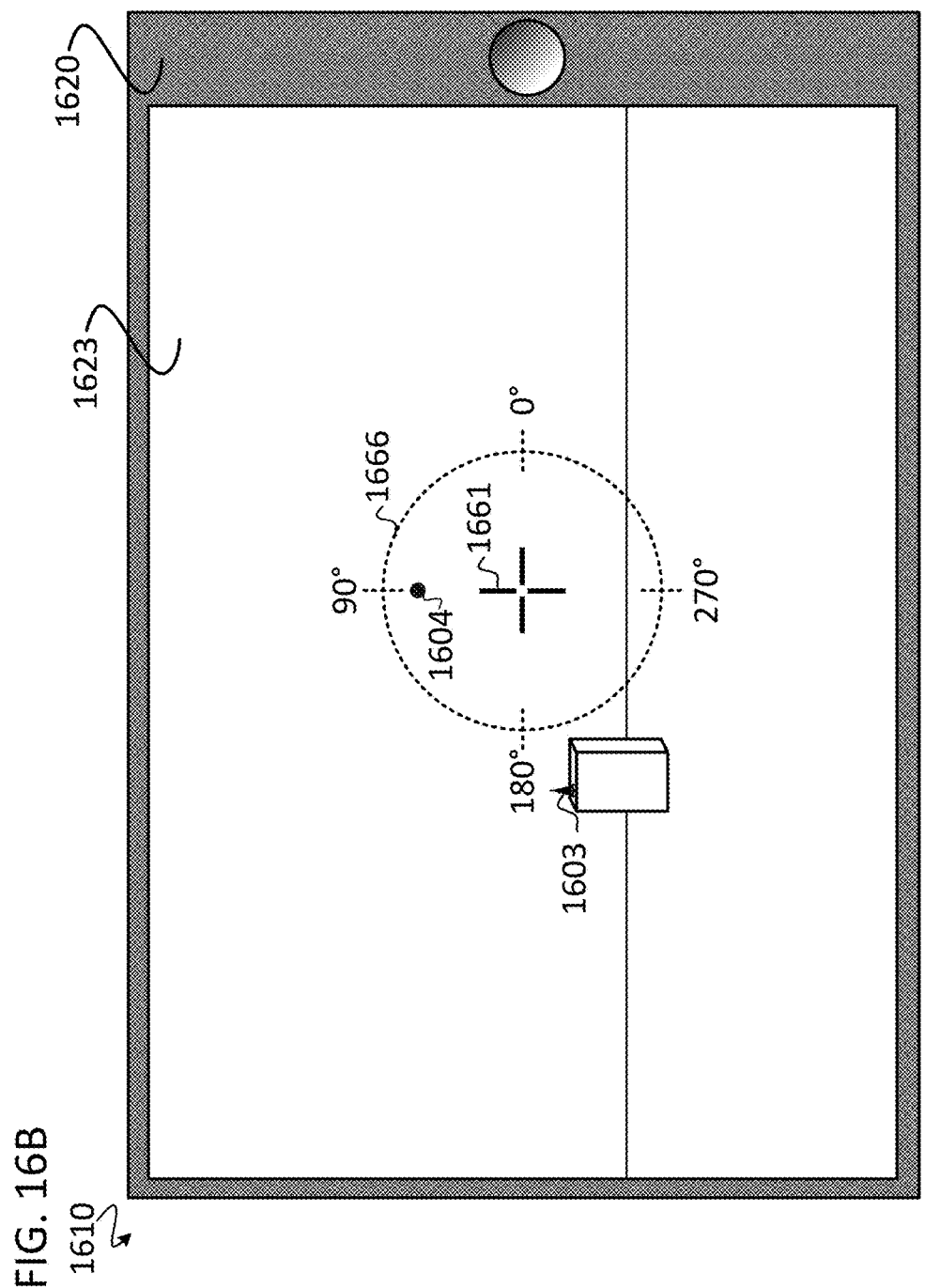

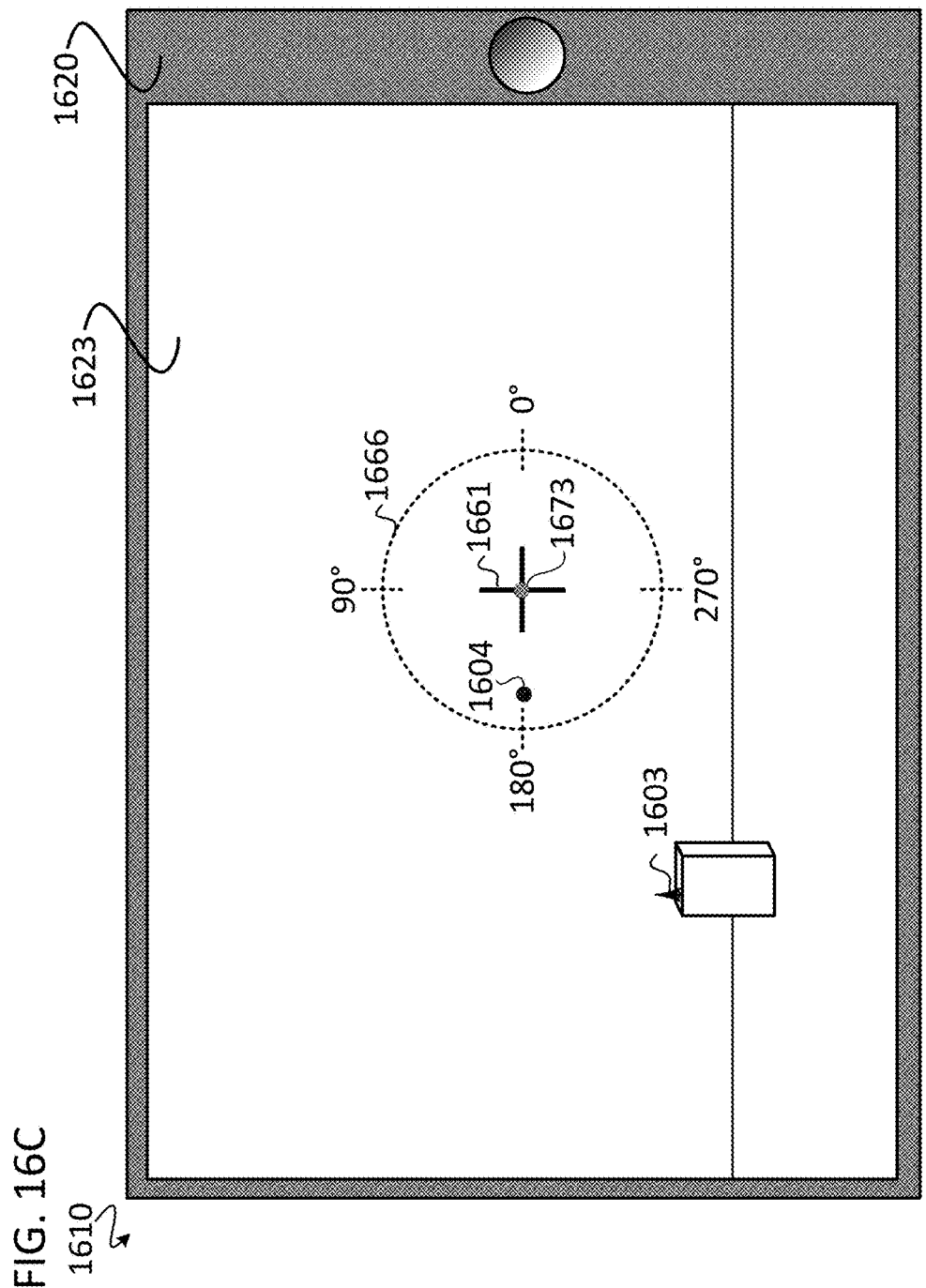

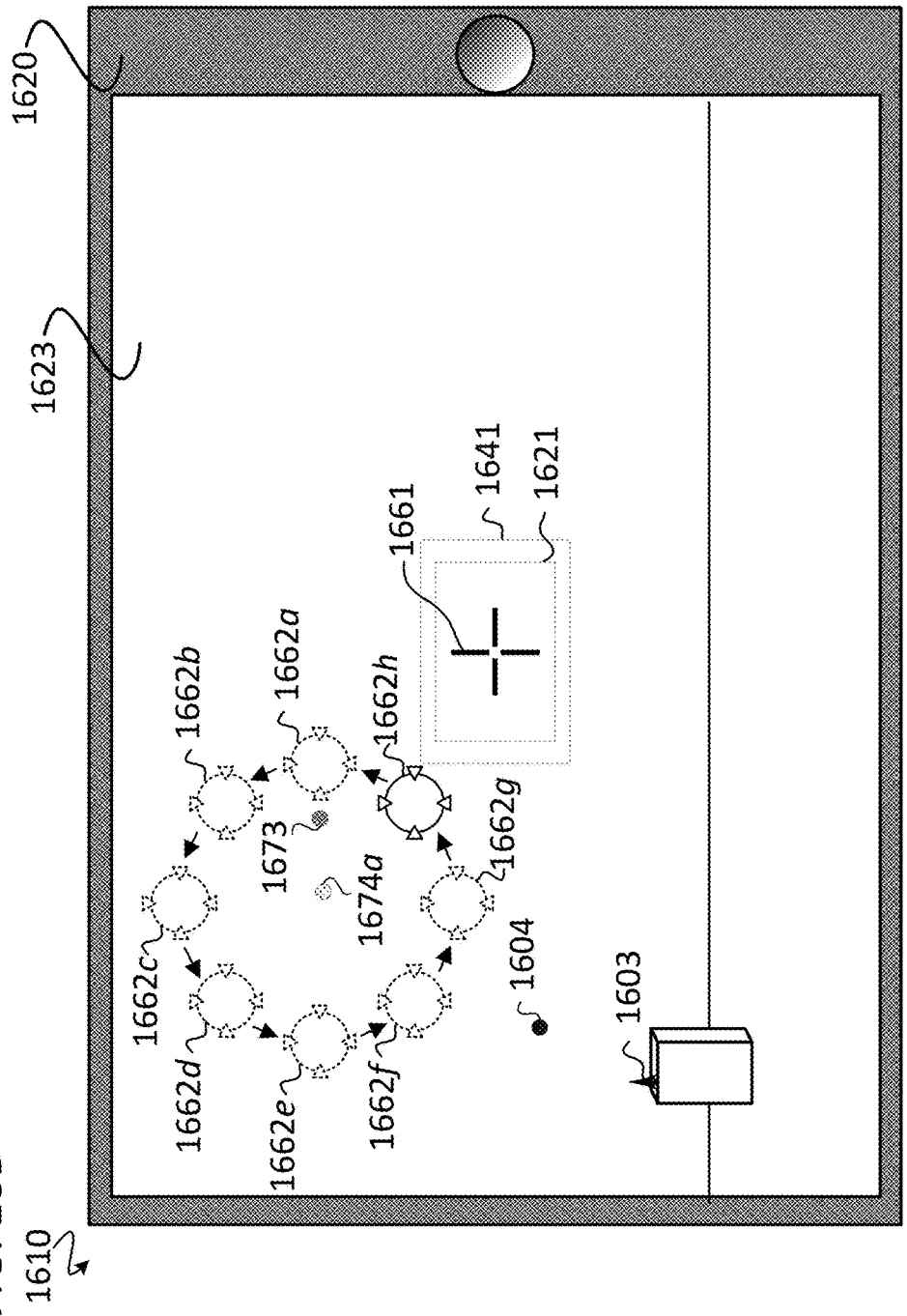

SELECTIVELY CONTROLLING A DIRECTION OF SIGNAL TRANSMISSION USING ADAPTIVE AUGMENTED REALITY

RELATED APPLICATIONS

This application is a continuation in part of U.S. patent application Ser. No. 15/581,419 filed on Apr. 28, 2017 and entitled "Pointing an Antenna at a Signal Source using Augmented Reality," and is related to U.S. patent application Ser. No. 15/455,775, filed on Mar. 13, 2017 and entitled "Reduced Power for Avoidance of Interference in Wireless Communications," and U.S. patent application Ser. No. 15/461,854, filed on Mar. 17, 2017 and entitled "Adaptive Augmented Reality Satellite Acquisition," all of which are hereby incorporated by reference for all purposes.

BACKGROUND

Though terrestrial communication networks now reach much of the earth, there are still many regions in which an individual is not able to exchange communication information with another individual. This communication information could include voice, text or video data that the individual ("user") desires to exchange with the other individual using a device such as a cell phone ("user device"). The user could be prevented from exchanging communication information because the user is in an environment where there are no terrestrial communication networks to provide cell service or internet access, or perhaps is in a region that does not have a terrestrial communication network that the user is authorized to use.

To receive convenient and predictable communication connectivity, the user may use a communication device that is capable of exchanging communication signals between the communication device and satellites of a satellite constellation. Examples of satellite constellations include the Global Positioning System (GPS), Galileo and GLONASS constellations for navigation and geodesy, the Iridium and Globalstar satellites for telephony services, the Disaster Monitoring Constellation and RapidEye for remote sensing, the Orbcomm satellites for messaging service, the Russian elliptic orbit Molniya and Tundra constellations and the Cospas-Sarsat search and rescue satellites.

Such satellites include Low Earth Orbiting satellites (LEOs), Geostationary Satellites (GEOs), or other satellites. LEO satellites travel at high angular velocity to maintain orbit. As a result, the coverage area provided by a LEO satellite moves as the LEO satellite travels. Thus, many LEO satellites are often needed to maintain continuous coverage over an area.

Because the coverage area provided by a LEO satellite moves, when a user wishes to initiate communications, it may be minutes or hours before a LEO satellite is above the horizon and can begin the exchange of communication signals. GEO satellites, by contrast, move at the same angular velocity as the rotation of the earth's surface and can provide permanent coverage over a large area. Thus, to maintain constant and predictable communication, GEO satellites are sometimes preferred over LEO satellites for communication.

To communicate with GEO satellites with acceptable signal strength, and to avoid interfering with other satellites or terrestrial transceivers that operate in the same frequency band as the communication device, the communication device may be designed to have a narrow antenna lobe and must point precisely towards its intended satellite before transmitting and/or receiving a communication signal. However, because such communication devices may be optimized for size, weight and portability, traditional antenna pointing systems for high accuracy antenna pointing may be undesirable or impractical.

SUMMARY

In some embodiments, one or more systems carry out a method that involves determining, by a communication device having an antenna, a direction to an intended transceiver. The direction is substantially in an actual direction to the intended transceiver. The communication device determines a desired direction that is different from the direction to the intended transceiver. An anticipated direction to the desired direction is determined by the communication device. The communication device determines, based on the desired direction, parameters of expected energy values corresponding to multiple pre-defined antenna directions of the antenna around the desired direction. Using the antenna, the communication device receives multiple measured energy values corresponding to multiple antenna directions of the antenna around the anticipated direction. The communication device calculates a directional offset using the multiple expected energy parameters and the multiple measured energy values. An updated anticipated direction is generated by the communication device by updating the anticipated direction based on the calculated directional offset. The steps of receiving multiple measured energy values, through generating the updated anticipated direction, are repeated using the updated anticipated direction as the anticipated direction.

In some embodiments, a communication device that uses augmented reality to selectively control signal transmission direction is disclosed. The communication device includes: an antenna that receives a signal from an intended source; a receiver module coupled to the antenna to receive and process the signal; a sensor module to determine directional and position information of the communication device; a memory that stores instructions; and a processor coupled to the receiver module, the sensor module, and the memory and configured to execute the instructions. The instructions, when executed by the processor, cause the processor to determine, using the receiver module and the sensor module, a direction to an intended transceiver, the direction being substantially in an actual direction to the intended transceiver. The communication device determines a desired direction that is different from the direction to the intended transceiver and an anticipated direction to the desired direction. Based on the desired direction, parameters of expected energy values corresponding to multiple pre-defined antenna directions of the antenna around the desired direction are determined. The communication device receives, using the receiver module, multiple measured energy values corresponding to multiple antenna directions of the antenna around the anticipated direction. Each measured antenna direction of the multiple antenna directions is measured using the sensor module. A directional offset is calculated using the multiple expected energy parameters and the multiple measured energy values. The communication device generates an updated anticipated direction by updating the anticipated direction based on the calculated directional offset. The steps of receiving multiple measured energy values through generating the updated anticipated direction are repeated using the updated anticipated direction as the anticipated direction.

BRIEF DESCRIPTION OF THE DRAWINGS

FIG. 5 is a simplified diagram of an environment incorporating the communication device shown in FIG. 4, in accordance with some embodiments.

FIG. 6A-6E are simplified representations of the communication device shown in FIG. 4, in accordance with some embodiments.

FIG. 7A-7B are simplified flowcharts of an example process performed by the communication device shown in FIG. 4, in accordance with some embodiments.

FIG. 10 is a simplified representation of the communication device shown in FIG. 4 and a simplified scatter plot of multiple energy values, in accordance with some embodiments.

FIG. 11 is a simplified example process performed by the communication device shown in FIG. 4, in accordance with some embodiments.

FIG. 15A-B is a simplified example environment for selectively controlling a direction of signal transmission using adaptive augmented reality, in accordance with some embodiments.

FIG. 16A-E are simplified representations of the communication device shown in FIG. 4, in accordance with some embodiments.

DETAILED DESCRIPTION

Figure 1:
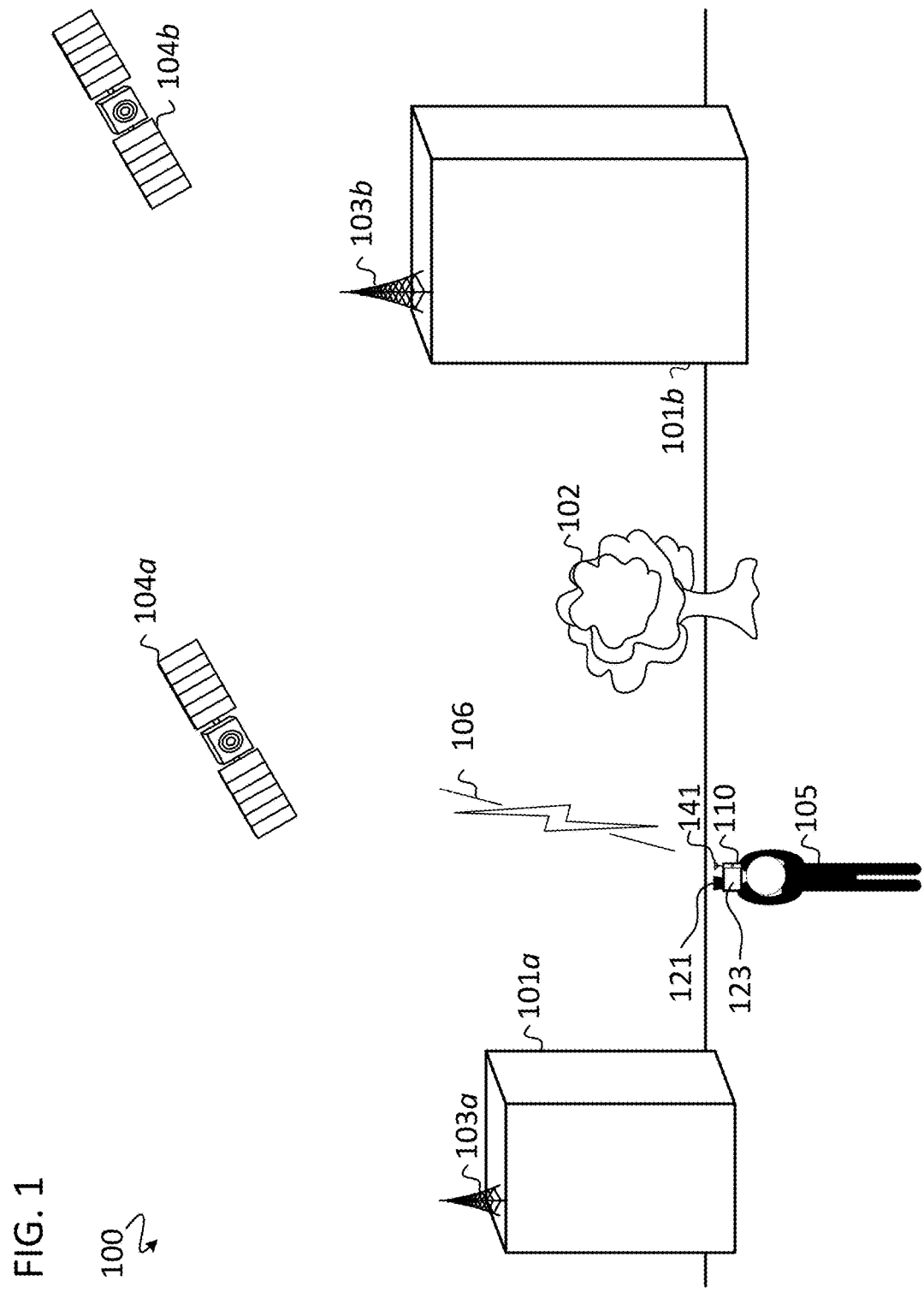
FIG. 1 is a simplified example environment for determining a direction to a signal source using augmented reality, in accordance with some embodiments.

In some embodiments, augmented reality enables an improved technique for pointing an antenna of a communication device in the direction of a communication satellite to exchange communication messages between the communication device and the communication satellite. As described below, a display of the communication device is overlaid with the augmented reality information to guide a user of the communication device to zero-in on the communication satellite's position in the sky. In this manner, complex, heavy, expensive equipment for automatically aligning the antenna of the communication device with the satellite is not needed. The systems and methods described below, therefore, enable an improved, inexpensive and highly portable solution for pointing the antenna at the communication satellite, among other improvements and advantages.

There are many regions in which an individual is not able to exchange (e.g. send and/or receive) communication information with another individual. As is disclosed in U.S. patent application Ser. No. 15/461,854, filed on Mar. 17, 2017 and entitled "Adaptive Augmented Reality Satellite Acquisition" all of which is incorporated herein by reference, in such regions the user can communicatively and physically couple a user device to a communication transceiver device ("communication transceiver"). Thereafter, communication information originating at the user device is received by the communication transceiver, the communication information is imprinted onto communication signals, and the communication signals are transmitted from the communication transceiver to a satellite communication network using an antenna of the communication transceiver. Similarly, communication signals (e.g. satellite transmission signals) carrying communication information are transmitted back from the satellite communication network and received by the antenna of the communication transceiver. The communication information is retrieved from the communication signals and provided from the communication transceiver to the user device. Thus, a user of the coupled user device and communication transceiver device ("communication device") can exchange communication information in regions that lack usable terrestrial communication networks. To provide predictable communication connectivity, in some embodiments, communication signals are exchanged with communication satellites that are in a geosynchronous orbit (GEO satellites), low earth orbit (LEO satellites), or satellites in any other orbit.

However, as such communication devices proliferate, there is an increased likelihood that the user may be in, or near, a region that has terrestrial transceivers operating in the same frequency band as the communication transceiver (e.g. the microwave frequency band). For example, many terrestrial data/communication networks use line-of-sight data relays that operate in the microwave frequency band. If the user were to point the antenna of the communication transceiver (also operating in the microwave frequency band) substantially towards a terrestrial transceiver, the terrestrial transceiver could experience data loss, distortion, or other signal impairments. A terrestrial transceiver is just one example of an unintended receiver/transceiver. In some embodiments, the unintended receiver is a satellite. In some embodiments, there are multiple unintended receivers and the multiple unintended receivers include terrestrial receivers and/or satellite-based receivers.

To prevent unintentional transmissions to unintended receivers, and to provide sufficient gain for communicating with GEO satellites (which have a high orbital altitude as compared to LEO satellites), in some embodiments, the antenna of the communication transceiver is designed to have a narrow main lobe. Alternatively, or in addition, as described in U.S. patent application Ser. No. 15/455,775, filed on Mar. 13, 2017 and entitled "Reduced Power for Avoidance of Interference in Wireless Communications," to prevent interference with the unintended receiver, the system may be designed to cause the antenna of the communication device (e.g. by a user of the communication device) to be pointed in a desired direction which is different from the direction towards the intended receiver.

The position of a GEO or LEO satellite and the position of the communication device may be relatively precisely known. However, due to inaccuracies in motion and orientation sensors of the user device, such as accelerometers, magnetometers and gyroscopes, the alignment or orientation of the user device is not precisely known. Thus, although the position of the communication satellite is known, there is ambiguity in the direction that the antenna of the communication device is pointing.

As will be discussed, precise antenna pointing is often accomplished using an antenna that is adjustably mounted on a fixed base (e.g. a pedestal). The pointing direction of the antenna relative to the fixed base is often adjusted using a manual process (e.g. by manually rotating the antenna on a gimbal) or by a motor driven process. However, such solutions lack portability and involve heavy, complex, expensive equipment. For example, if the user is an athlete or a hiker, the user may be very sensitive to any additional weight or bulk that the user needs to transport. Therefore, the user may need to point the antenna of the communication transceiver, which has a narrow main lobe, substantially in the direction of the communication device without the stability of a fixed pedestal and without the precision of motor controlled positioning.

Systems and methods for pointing an antenna of a communication device, held by a user, substantially in the direction of a communication satellite, or in the desired direction, are disclosed herein. Such systems and methods advantageously do not require using an antenna that is adjustably mounted on a fixed base. In some embodiments, a camera of the communication device that is pointed substantially in the same direction as the direction of the main lobe of the antenna is used with motion/position sensors of the communication device, and with the antenna, to generate an adaptive augmented reality display on a display screen of the communication device. The augmented reality display is used to instruct/guide the user to point the communication device in multiple directions around an anticipated direction of the communication satellite or the desired direction (thereby pointing the antenna in the multiple directions). Transmission signals transmitted from the communication satellite are received by the antenna and are used to determine signal energy/signal power values associated with the multiple pointing directions. The terms "signal energy" and "signal power" are used interchangeably herein as the signal power can be inferred from the signal energy and vice versa. After sufficient signal energy values have been collected (e.g. enough to perform a curve fitting algorithm), the signal energy values are used to determine an updated anticipated direction of the communication satellite or the desired direction. The augmented reality display can then continue to instruct the user to point the communication device in multiple directions around the updated anticipated direction of the communication satellite or the desired direction. By continually and adaptively adjusting and or/refining the pointing direction of the antenna, communication signals are exchanged between the communication device and the communication satellite with sufficient signal strength, and unintentional transmissions to terrestrial receivers (or unintended satellite-based receivers) are avoided, without the use of a fixed-base mount or motor control. Other improvements or advantages will also be described below or become apparent from the following disclosure.

FIG. 1 is a simplified example environment 100 for pointing an antenna in the direction of a signal source using augmented reality, in accordance with some embodiments. The simplified environment 100 has buildings 101a-b, a tree 102, terrestrial transceivers (e.g. line-of-sight microwave transceivers) 103a-b, communication satellites ("satellites") 104a-b, a user 105, and communication signals 106. As shown, the user 105 is holding and facing a communication device 110 that includes a camera 121, a display screen 123, and an antenna 141. The camera 121 and the antenna 141 are shown to be mounted on an upper side of the communication device 110 for clarity only. In some embodiments, the camera 121 and the antenna 141 are both located on a side of the communication device 110 that is opposite the display screen 123.

In some embodiments, the communication device 110 includes a user device, such as a cell phone, communicatively and physically coupled to a communication transceiver (not shown). In some embodiments, the user device includes the camera 121 and the display screen 123, and the communication transceiver includes the antenna 141. The communication device 110 can also be referred to as a terminal, or a satellite terminal.

The user 105 exchanges communication information with another individual (not shown) using the communication signals 106 transmitted from and/or received by the satellite 104a and the communication device 110 using the antenna 141. In some embodiments, the terrestrial transceivers 103a-b may transmit and receive signals in the same frequency band as the communication signals 106. The communication satellites 104a-b may be GEO satellites, LEO satellites, or satellites of another orbital altitude (e.g. non-GEO satellites, non-LEO satellites, or other satellites as known to one of skill in the art).

In some embodiments, the antenna 141 is designed to have a narrow main lobe. The narrow main lobe provides a desirable level of signal gain for transmitting and receiving communication signals 106 exchanged between the communication device 110 and the communication satellite 104a. Further, the narrow main lobe minimizes the risk of the user 105 inadvertently transmitting the communication signals 106 towards the terrestrial transceivers 103a-b (or towards satellite transceivers that are not part of a communication network that the user is authorized to communicate with). Precise antenna pointing is often accomplished using an antenna that is adjustably mounted on a fixed base (e.g. a pedestal), such as prior art antennas shown in FIG. 2 and FIG. 3. However, methods and systems are disclosed herein to advantageously accomplish precise antenna pointing without the use of such encumbrances.

Figure 2:
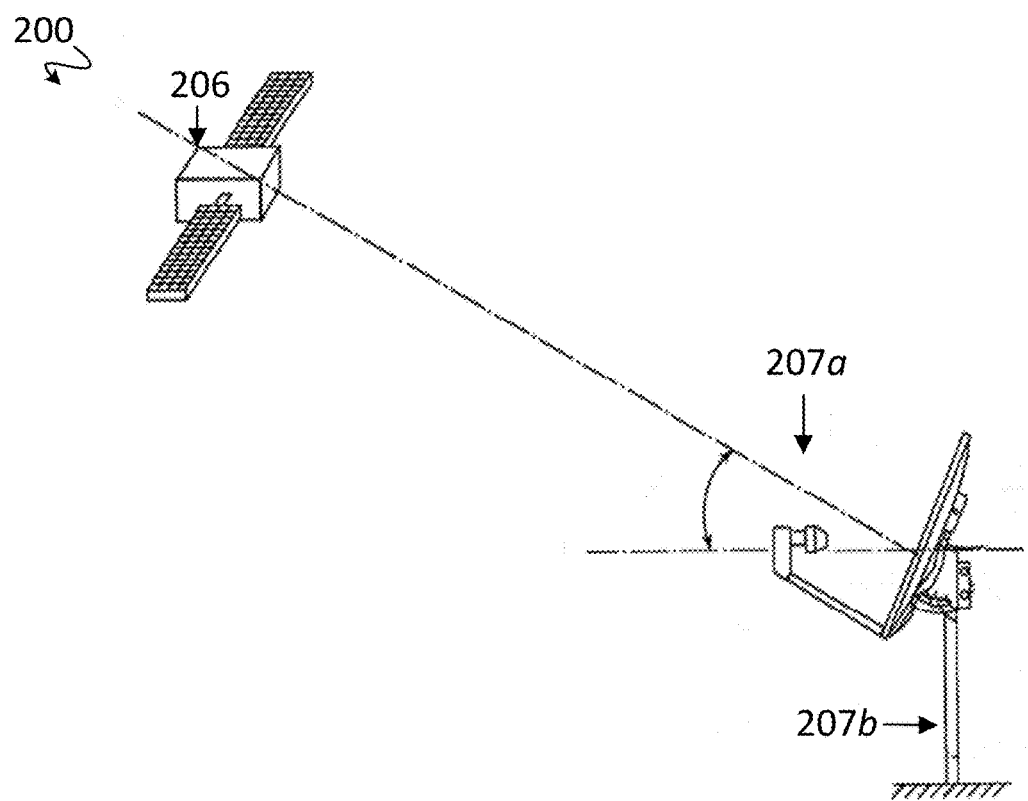
FIG. 2 is a prior art communication system.

FIG. 2 is a prior art communication system 200. The communication system 200 includes a satellite 206 and an antenna 207a. The antenna 207a is mounted on a fixed pedestal 207b. The antenna 207a can receive signals from (and transmit signals to) the satellite 206 when the antenna 207a is pointed in the direction of the satellite 206 within an acceptable tolerance. The antenna 207a can be made to point in the direction of the satellite 206 by way of manual adjustments made to the antenna 207a. Typically, after the antenna 207a is made to point in the direction of the satellite 206, the pointing direction of the antenna 207a is locked in place with mechanical fasteners (e.g. wing-nuts). Such mechanical locking is in contrast with the hand-held communication device 110 of FIG. 1.

Figure 3:
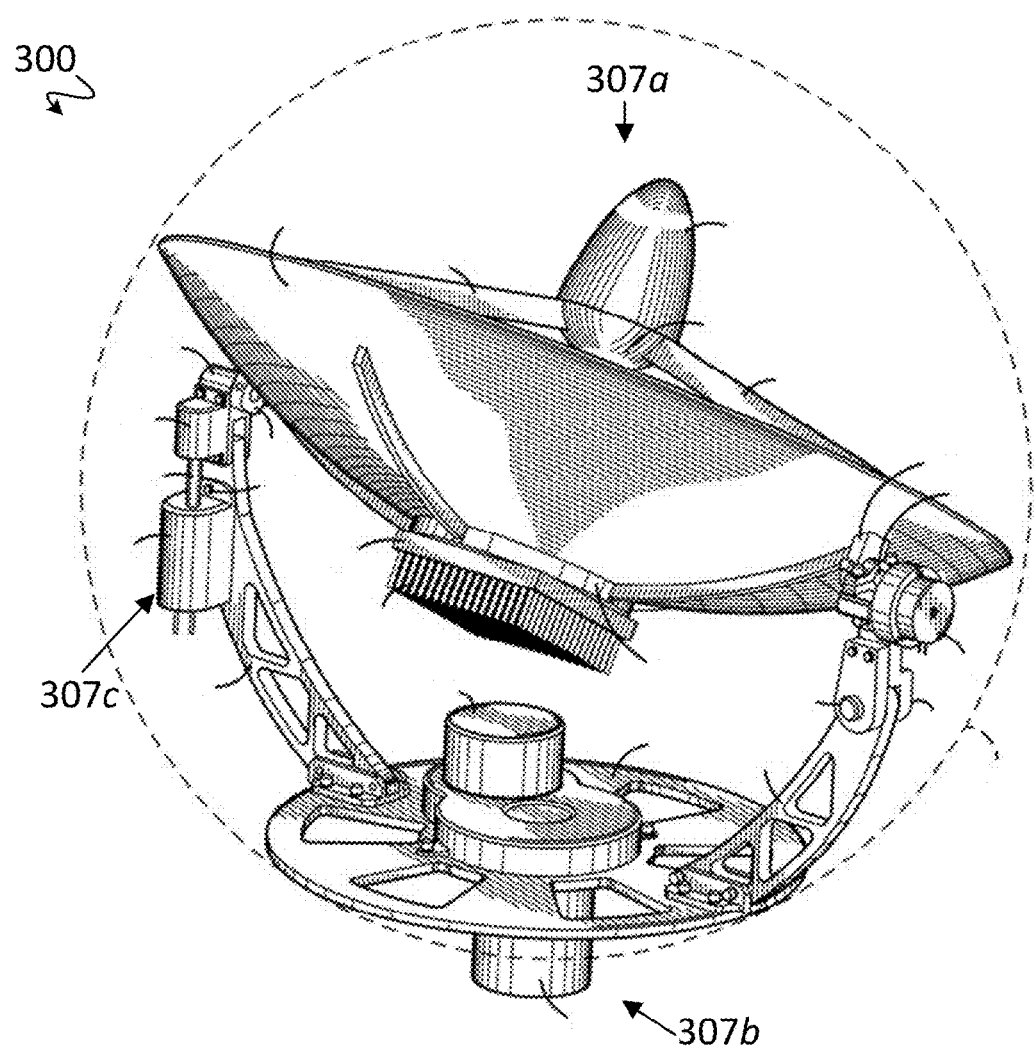
FIG. 3 is another prior art communication system.

FIG. 3 is another prior art communication system 300. The communication system 300 includes a satellite (not shown) and an antenna 307a that is coupled to a fixed mounting base 307b. The antenna 307a can receive signals from the satellite when the antenna 307a is pointed in the direction of the satellite. The fixed mounting base 307b includes a motor drive 307c that when enabled can precisely adjust the pointing direction of the antenna 307a. Typically, an antenna with motorized control can be made to point in a direction with high accuracy, precision and repeatability. Additionally, an antenna with motorized control can typically be made to track a moving satellite (e.g. a LEO satellite) without operator intervention.

Such motorized control is in contrast with the hand-held adjustments made by a user for positioning the communication device 110 of FIG. 1. A user 105 of FIG. 1 would find transporting a mounting pedestal and motor drives such as those shown in FIG. 2 and FIG. 3 to be impractical and unappealing. However, to effectively exchange communication signals with a communication satellite, and to avoid unintentional transmissions in the directions of terrestrial transceivers, the user 105 often still needs a way to point the communication device 110 in the direction of the satellite 104a or in the desired direction.

Figure 4:
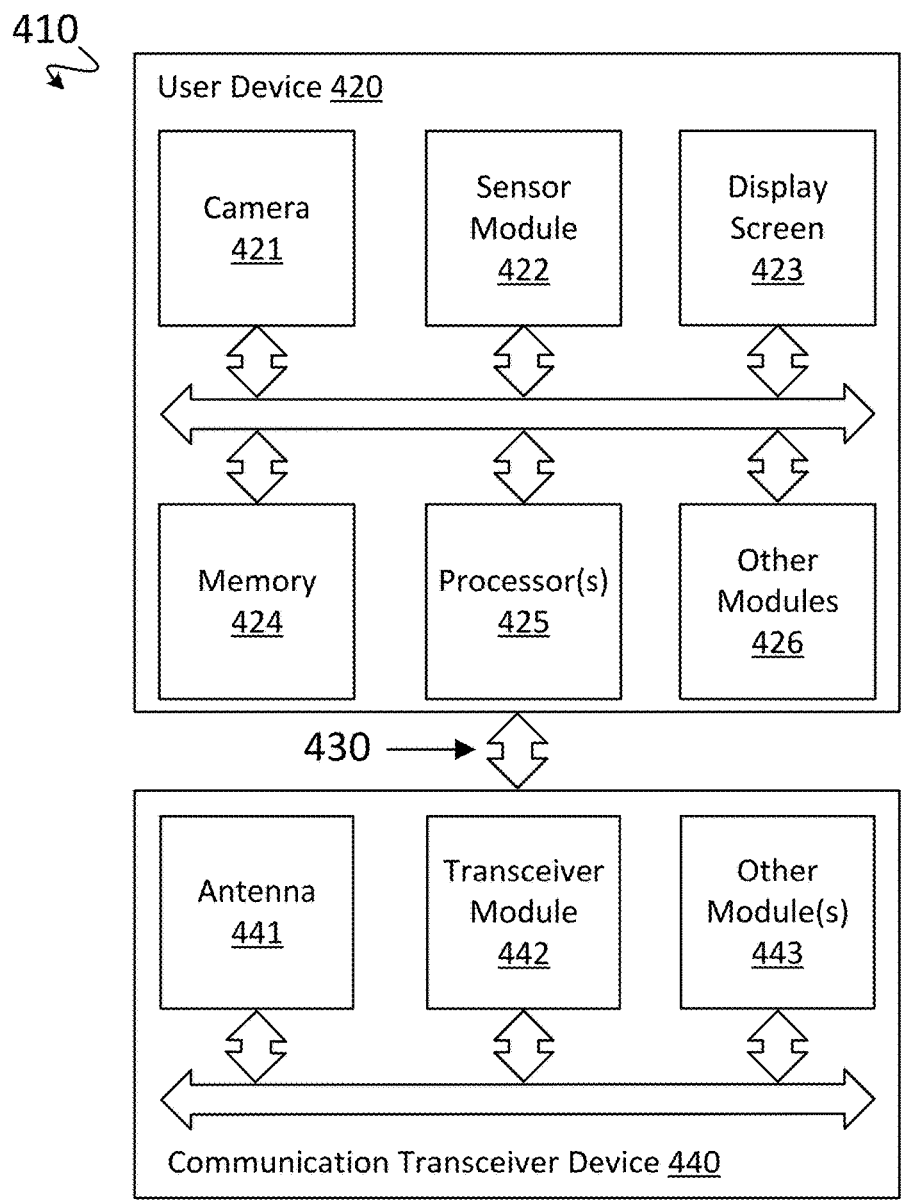
FIG. 4 is a simplified schematic diagram of a communication device, in accordance with some embodiments.

FIG. 4 shows a communication device 410 for pointing an antenna in the direction of a signal source or in the desired direction using augmented reality. The communication device 410 is the same, or is similar to, the communication device 110 of FIG. 1. Some elements are omitted for ease of illustration and explanation. The illustrated elements are shown for illustrative and explanatory purposes only, so other embodiments may include more or fewer elements or different combinations of elements.

As shown, the communication device 410 includes a user device 420 and a communication transceiver device ("communication transceiver") 440. In some embodiments, the user device 420 is a cell phone, a tablet or a laptop. In some embodiments, the user device 420 is physically coupled to the communication transceiver 440. In some embodiments, the communication transceiver 440 is mounted onto a back side of the user device 420. In some embodiments, the user device 420 and the communication transceiver 440 are integrated into a single device (e.g. a satellite terminal). The user device 420 is communicatively coupled to the communication transceiver 440 through a link 430. In some embodiments, the link 430 is an RF link (e.g. a Wi-Fi or Bluetooth link). In other embodiments, the link 430 is a wired link (e.g. using a USB, I2C, SPI, RS-232 or another communication protocol). The link 430 can provide communication signals, control signals, or other signals between the user device 420 and the communication transceiver 440. In some embodiments, the link 430 can also provide power to or from the user device 420. In yet another embodiment, the communication transceiver 440 is integrated into the user device 420 and is an integral part of the user device 420.

The user device 420 includes a camera 421, a sensor module 422, a display screen 423, memory 424, processor(s) 425, and other module(s) 426. The camera 421 captures video images in the field of view (FOV) of the camera 421 and may provide the captured video images to the processor(s) 425, or may pass the captured video images directly to the display screen 423. The sensor module 422 generates sensor data using magnetometers, accelerometers, gyroscopes, GPS receivers, and/or other sensors and provides the sensor data to the processor(s) 425. The processor(s) 425 uses the sensor data to determine an estimated position of the communication device 410 as well as a pointing direction of the communication device 410 within a reference frame, such as with reference to true north and with further reference to a horizontal plane on which the user is located. For example, the pointing direction of the communication device 410 can include an azimuthal angle and a polar angle measured relative to the reference frame. The display screen 423 receives display instructions and/or display data from the processor(s) 425 to display the video images and a graphical overlay. The memory 424 can store data, such as coordinates of the communication device 410, pointing directions of the communication device 410, parameters indicative of locations of an intended receiver, parameters indicative of the locations of other unintended receivers, and signal energy/power values calculated by the communication device 410. Additionally, the memory 424 can store instructions that when carried out by the processor(s) 425 perform method steps. The memory 424 can store other parameters as well.

The other module(s) 426 can include Bluetooth communication modules, Wi-Fi communication modules, power storage and control modules, USB host and/or peripheral modules, and/or other modules. The processor(s) 425 include one or more processors and can include both a central processing unit (CPU) and a graphical processing unit (GPU), or other processors capable of processing signals, executing instructions and generating graphical interfaces.

The communication transceiver device 440 includes an antenna module ("antenna") 441, a transceiver module 442 and other module(s) 443. The antenna module 441 and the transceiver module 442 can transmit signals to, and receive signals from, a satellite such as the satellite 104a described with reference to FIG. 1. In some embodiments, the antenna module 441 includes a patch antenna. In some embodiments, the communication transceiver device 440 has a separate receiver module and a separate transmitter module, where each module is respectively coupled to the antenna 441. The other module(s) 443 can include Bluetooth communication modules, Wi-Fi communication modules, power storage and control modules, USB host and/or peripheral modules, and/or other modules. Satellite transmission signals received by the antenna 441 are processed by the communication device 410 using either or both communication transceiver 440 and the user device 420 to demodulate/de-spread the received signals, extract communication information, and/or determine signal energy values of the received signal. In some embodiments, the camera module 421 and/or the sensor module 422 are part of the communication transceiver 440. In some embodiments, the satellite transmission signals received by the antenna 441 are pilot signals.

Specific functions of either the user device 420 and/or the communication transceiver device 440 are provided for illustrative purposes only. Where appropriate, any component may be implemented in either the user device 420, the communication transceiver device 440, or in the combined integrated communication device 410.

In some embodiments, the user device 420 and the communication transceiver device 440 are physically connected such that the user device 420 and the communication transceiver device 440 cannot be moved independently of one another. In this case, the camera 421 may be implemented as part of either the user device 420 or the communication transceiver device 440, since its field of view aligns with the antenna direction in either or both of these implementations. In other embodiments, the user device 420 and the communication transceiver device 440 are connected by the link 430, as previously described, but are not otherwise connected. That is, in such embodiments, the communication transceiver device 440 can be moved independently of the user device 420. In this case, the camera 421 is part of the communication transceiver device 440, so that its field of view aligns with the antenna direction. In some embodiments, the communication device 410 is a single device that includes modules as described with respect to the user device 420 and the communication transceiver device 440.

The antenna module 441 has a main lobe that points substantially in the same direction as the center of the FOV of the camera 421 points. This is illustrated in FIG. 5. As shown, an environment 500 includes a satellite 504a that is similar to the satellite 104a and a simplified communication device 510 that is similar to the communication device 410. The communication device 510 includes a camera 521, a display screen 523, an antenna 541, as well as other sensors, processors and modules (not shown) as were discussed with reference to FIG. 4. Also shown is the camera FOV 550 of the camera 521 and the antenna main lobe ("antenna lobe") 551 of the antenna 541. The antenna lobe 551 is a simplified representation of an antenna main lobe and does not depict side-lobes of the antenna lobe 551, which may be present.

The camera 521 captures video images in the field of view 550 and the captured video images are displayed on the display screen 523. As shown, the center of the field of view 550 points in substantially the same direction as the center of the antenna lobe 551. Thus, the camera 521 "looks" in the same direction that the antenna 541 can send and receive signals to/from. Because the direction of the camera field of view 550 and the antenna lobe 551 are substantially the same, a user of the communication device 510 can observe, using the display screen 523, obstructions that may be in the path of signals exchanged between the antenna 541 and the satellite 504a. Advantageously, the user of the communication device 510, having observed such signal path obstructions, can move or otherwise adjust their position to minimize obstructions (e.g. take a few steps to the left or the right of their initial position). Additionally, a graphical overlay on the display screen 523 is used to instruct the user of the communication device 510 to point the antenna 541 substantially in the direction of the satellite 504a.

Because of inaccuracies in motion, direction, and orientation sensors of the communication device 510, an initial anticipated direction to the satellite 504a (or towards the desired direction) may not be the same as the actual direction towards the satellite 504a (or towards the desired direction). Thus, the position of the satellite 504a icon (within the graphical overlay on the display screen 523) may not accurately reflect the actual position of the satellite 504a. As will be described, the communication device 510 uses an adaptive augmented reality display to instruct/guide the user to point the communication device 510 in a sequence of directions while measuring energy values of signals received from the satellite 504a. Thereby an updated anticipated direction to the satellite 504a (or towards the desired direction) is determined that is more accurate than the initial anticipated direction.

Figure 6A:
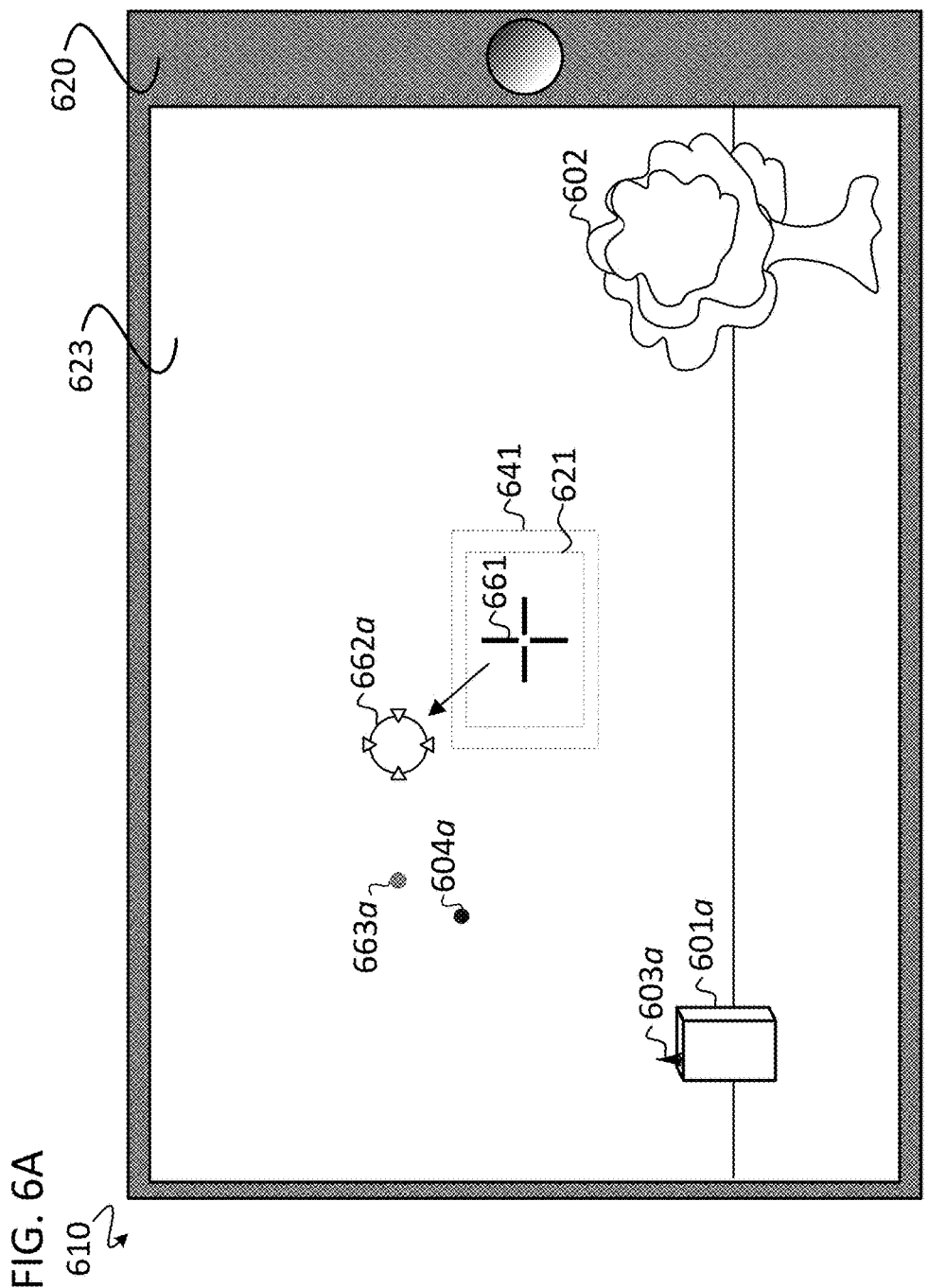

FIG. 6A shows a simplified representation of a communication device 610 that is the same or similar to the communication device 410. The communication device 610 includes a user device 620, a camera 621 (mounted on a side of the user device 620 that is opposite a display screen 623), the display screen 623, and an antenna 641 (mounted on the side of the user device 620 opposite that of the display screen 623 such that the main lobe of the antenna 641 points in substantially same direction as the center of the field of view of the camera 621 points).

An example display of the display screen 623 is shown. The display screen 623 displays video images captured by the camera 621. As shown, the captured video images include a building 601a, a tree 602, and a terrestrial transceiver 603a. The display screen 623 also displays a graphical overlay that is displayed on top of, or is blended with, the video images (e.g. an augmented reality display).

The graphical overlay includes an antenna direction indicator 661 and a guiding icon 662a. The guiding icon 662a can also be referred to as a "satellite icon". In accordance with a specific embodiment, the guiding icon 662a may include a displayed name, or any other satellite identification tag, of a specific satellite. The guiding icon 662a indicates a direction that the user of the communication device 610 should point the antenna 641. Thus, the guiding icon 662a and the antenna direction indicator 661 are used to guide/instruct the user regarding the direction that the user should move the communication device 610 to point the antenna 641 in the direction of the satellite. In other words, the displaying of the antenna direction indicator 661 and the guiding icon 662a enables the user holding the communication device 610 to move the communication device 610 to substantially align the guiding icon 662a and the antenna direction indicator 661 on the display screen so as to point the antenna 641 in a desired direction.

The antenna direction indicator 661 indicates the direction that the main lobe of the antenna 641 points. Thus, the antenna direction indicator 661 indicates the direction that communication signals can be transmitted in, and received from, with acceptable signal gain.

An anticipated direction 663a of a communication satellite and an actual direction to the communication satellite 604a are also shown. The anticipated direction 663a is an estimated direction to a communication satellite (e.g. the communication satellite 104a of FIG. 1) that is determined by the communication device 610 using sensor data (e.g. from a sensor module), satellite position information, as well as signal strength data measured using communication signals from the communication satellite. The actual direction of the satellite 604a is often not known due to positioning, directional and/or orientation inaccuracies of the communication device 610. The actual direction to the communication satellite 604a and the anticipated direction 663a are shown here for illustration purposes only and, in some embodiments, are not part of the graphical overlay. As shown, the anticipated direction 663a may be significantly offset from the actual direction to the communication satellite 604a.

An arrow pointing from the antenna direction indicator 661 to the guiding icon 662a is shown for illustration purposes and, in some embodiments, is not part of the graphical overlay. The arrow illustrates that the user of the communication device 610, upon observing the position of the guiding icon 662a on the display screen 623, will move the communication device 610 to minimize the distance on the display screen 623 between the antenna direction indicator 661 and the guiding icon 662a. By changing the position of the guiding icon 662a, the communication device 610 guides the user to point the antenna 641 in multiple directions around the anticipated direction 663a.

FIGS. 6B-6E show a simplified representation of the communication device 610 with an augmented reality display for instructing/guiding the user to point the communication device 610 in multiple directions around the anticipated direction 663a. The display screen 623 displays the video images described with reference to FIG. 6A and displays a graphical overlay that includes the antenna direction indicator 661. The anticipated direction 663a, the actual direction to the communication satellite 604a, and guiding icons shown in dashed lines are shown for illustration purposes and, in some embodiments, are not displayed on the display screen 623.

Figure 6D:
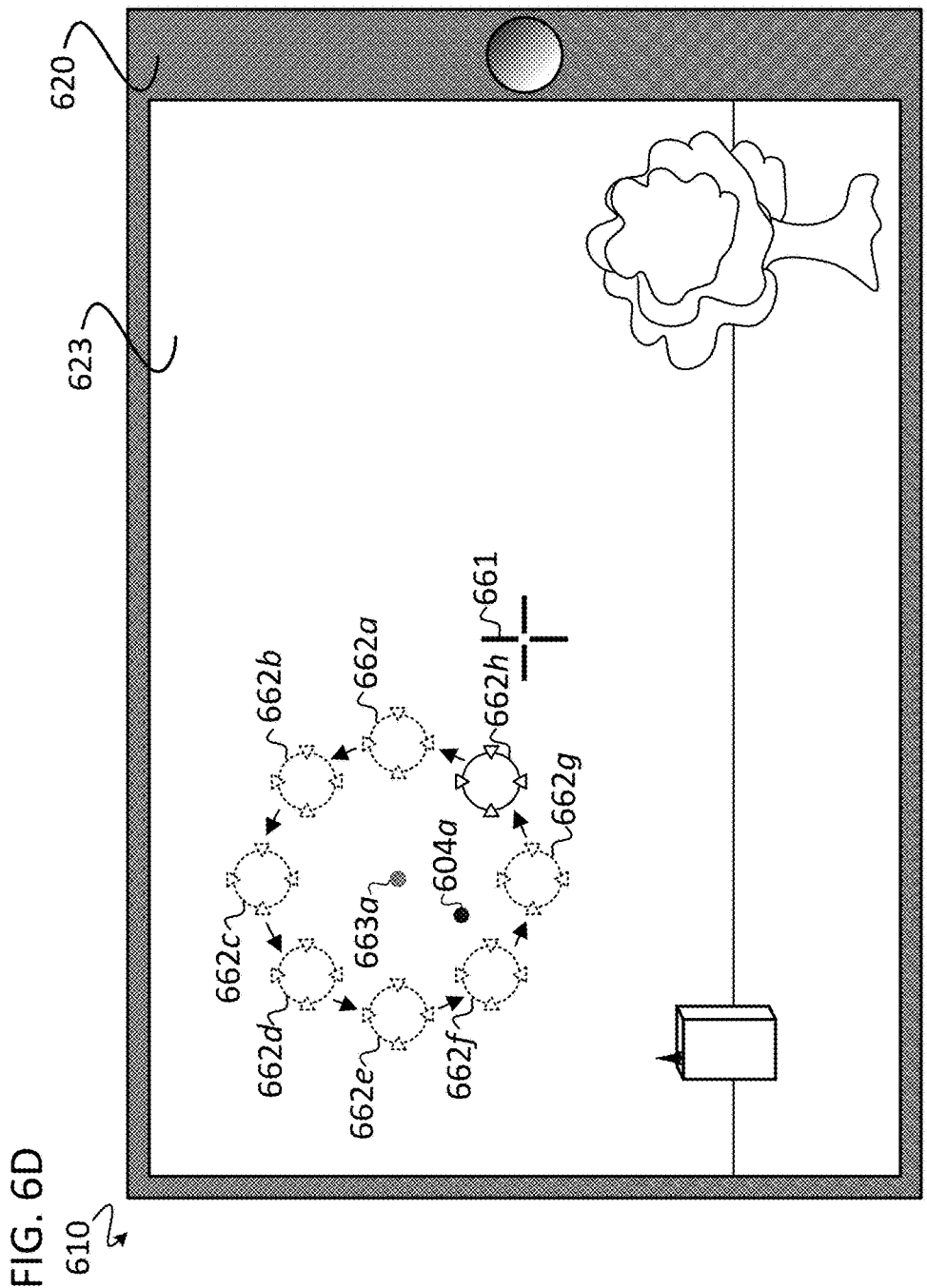
Figure 6E:
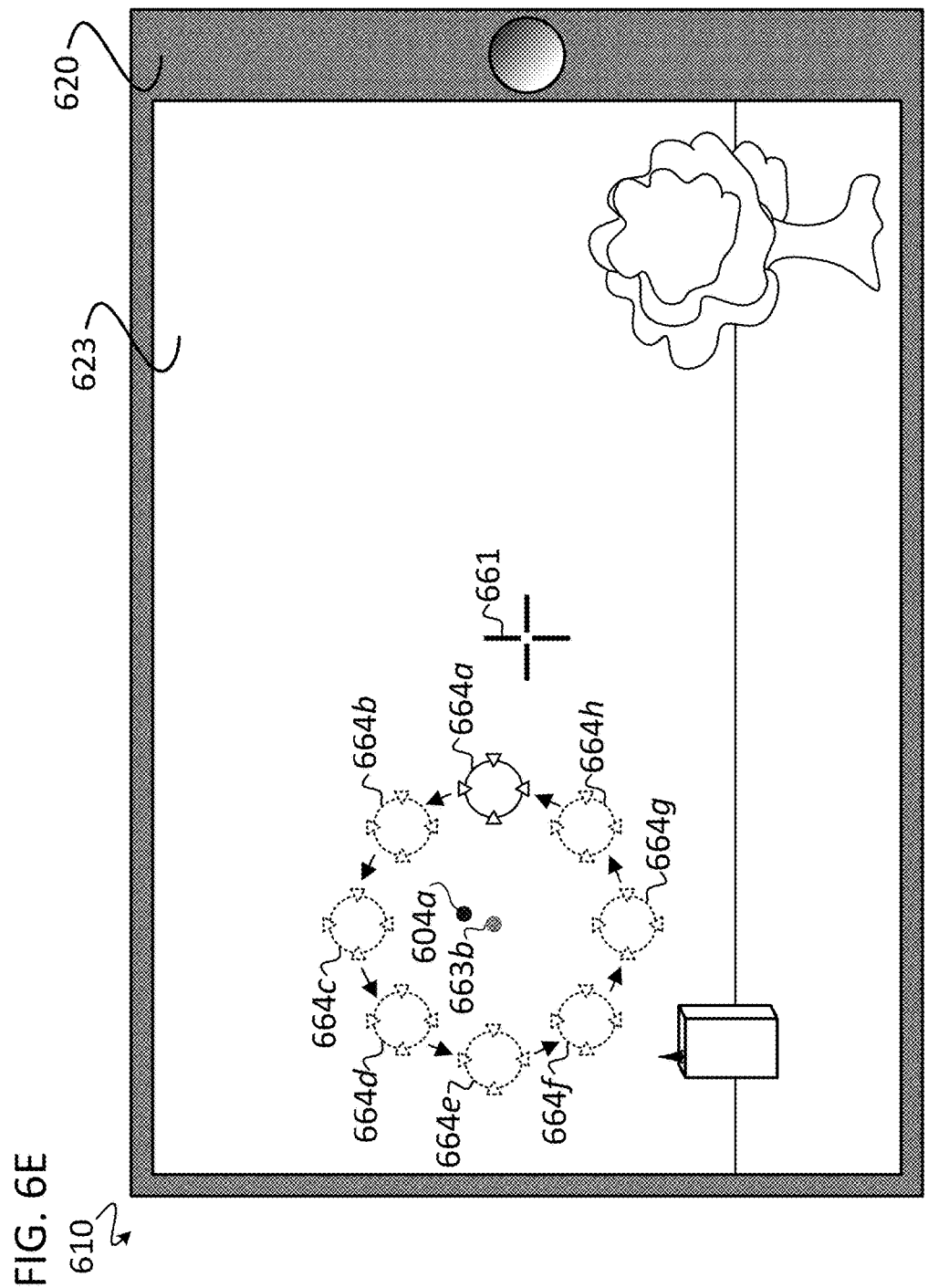
Figure 7B:
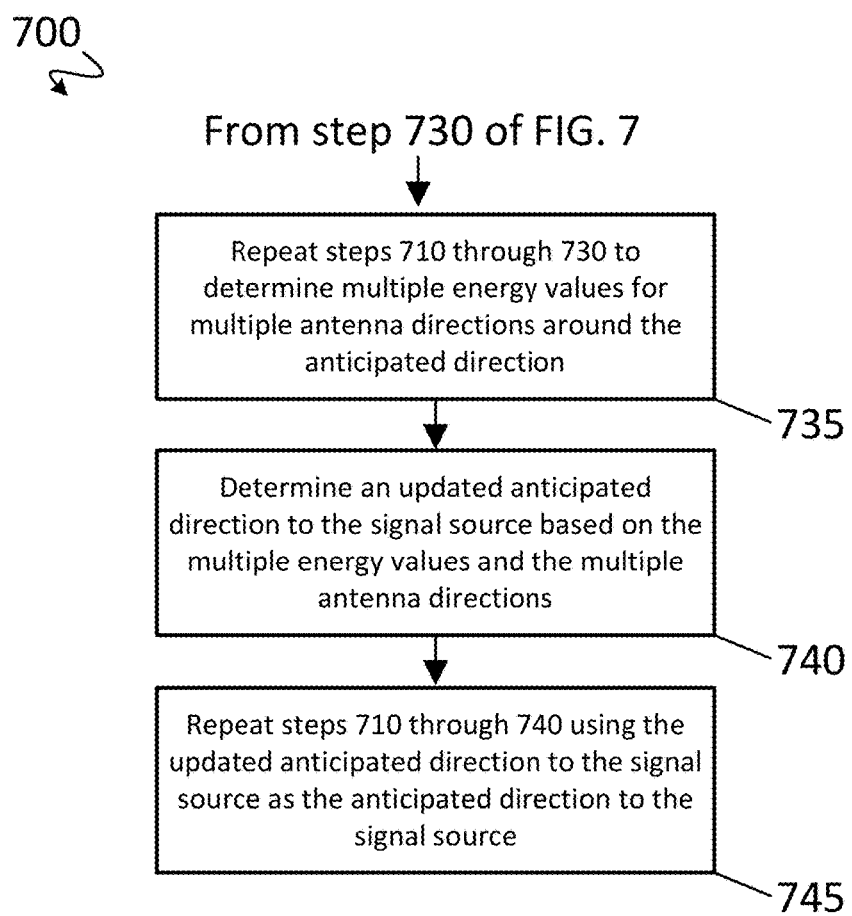

FIG. 6B includes an updated guiding icon 662b; FIG. 6C includes an updated guiding icon 662c; and FIG. 6D includes an updated guiding icon 662h and guiding icons 662d-662g. With reference to FIG. 6D, only the updated guiding icon 662h is displayed on the display screen 623 (as indicated by the use of solid lines) at the moment in time shown. The guiding icons 662a-662g indicate places on the display screen 623 where the guiding icon 662 was previously displayed (as indicated by the use of dashed lines). FIG. 6E includes an updated anticipated position 663b, an updated guiding icon 664a and guiding icons 664b-664h. Only the updated guiding icon 664a is displayed on the display screen 623 at the moment of time shown (as indicated by the use of solid lines). The guiding icons 664b-664h indicate places on the display screen 623 where the guiding icon 664 will be displayed shortly in the future (as indicated by the use of dashed lines). Details of FIGS. 6A-6E are discussed with reference to FIG. 7A and FIG. 7B. In some embodiments, steps for the process of FIG. 7A and FIG. 7B are stored in the memory 424 of the user device 420 and carried out by the processor(s) 425 of the user device 420.

FIG. 7A is a simplified flowchart of an example process 700 for using adaptive augmented reality to point an antenna of a communication device towards a communication satellite. Reference is made to FIG. 6A through FIG. 6B. The particular steps, order of steps, and combination of steps are shown for illustrative and explanatory purposes only. Other embodiments may use different steps, orders of steps, and combinations of steps to perform similar functions.

At step 705, an anticipated direction (e.g. 663a of FIG. 6A) to a signal source (the communication satellite 604a) is determined using a communication device (610) that includes an antenna (641). In some embodiments, the anticipated direction is determined as part of a signal acquisition process of the communication device (610). In other embodiments, the anticipated direction is determined using an estimated position of the communication device and data (such as known satellite position data) that is retrieved from memory of the communication device or retrieved from a remote storage source (e.g. a server or from another satellite). At step 710, the communication device (610) receives video images, from a camera (621) of the communication device (610), that are in the FOV of the camera (621). As was discussed earlier, the FOV of the camera (621) points substantially in the same direction as the main lobe of the antenna (641). At step 715, an antenna direction of the antenna (641) is determined using sensors, such as the sensor module 422 of FIG. 4, or using similar sensors that may be implemented in the communication device (410). The antenna direction is the direction that the antenna (641) points relative to a coordinate frame.

At step 720, the video images, an antenna direction indicator (661), and a guiding icon (662a) are displayed on a display screen (623) of the communication device. The antenna direction indicator indicates the direction (e.g. the direction of the main lobe of the antenna) that the antenna pointes relative to the field of view of the camera and the guiding icon represents a directional offset from the anticipated direction. In some embodiments, the antenna direction indicator is not relative to the field of view of the camera.

At step 725, an energy value is determined for a signal received from the signal source (e.g. a communication signal that is similar to the communication signal 106) using the antenna. In some embodiments, the signal is a spread-spectrum-signal. In some embodiments, before determining an energy value, the communication device first de-spreads and demodulates the received spread spectrum signal and performs a verification step to ensure that the signal was transmitted from the intended satellite and/or is not "noise". In some embodiments, multiple initial energy values are determined at this step and the energy value is an average of the multiple initial energy values. The determined energy value(s) can be stored by the communication device using memory such as the memory 424 of FIG. 4.

At step 730, a position of the guiding icon on the display screen is updated based on the anticipated direction. This is illustrated with reference to FIG. 6B. As shown, the updated guiding icon 662b is displayed on the display screen 623 and the guiding icon 662a is no longer displayed (as shown by dashed lines). By changing the position of a guiding icon on the display screen 623 from the position of the guiding icon 662a to the position of the guiding icon 662b, the user is guided/instructed to move the communication device 610 to minimize the distance between the antenna direction indicator 661 and the guiding icon 662b (e.g. to attempt to align the antenna direction indicator 661 with the guiding icon 662b).

The process shown in FIG. 7A is continued in FIG. 7B. Reference is made to FIG. 6C through FIG. 6E.

At step 735, steps 710 through 730 of FIG. 7A are repeated to determine multiple energy values for multiple antenna directions around the anticipated direction (663a). By way of example, FIG. 6C shows the updated guiding icon 662c that is displayed as the steps of FIG. 7A are repeated a first time for the user to attempt to move the communication device 610 to align the antenna direction indicator 661 with the guiding icon 662c, and FIG. 6D shows the updated guiding icons 662d-h that are displayed as the steps of FIG. 7A are repeated for a second-sixth time, although FIG. 6D does not show the attempt to align the antenna direction indicator 661 with the guiding icons 662d-h. In this manner, the user is guided to point the antenna 641 at various locations around the anticipated direction 663a. In some embodiments, the guiding icon is updated at a high enough rate that it appears to the user that the guiding icon is simply sliding across the display screen in a roughly circular or spiral pattern, as indicated in FIG. 6D, so that the user is guided to rotate or "wobble" the antenna direction generally around the anticipate direction 663a in a similar (without having to be an exact match) rough circular or spiral pattern. Additionally, in some embodiments, the measurements of the energy values of the signals received from the satellite 504a are generally made "on-the-fly" while the user rotates the antenna direction as guided or instructed, rather than waiting for the user to properly align the antenna direction indicator exactly with the guiding icon.

At step 740, an updated anticipated direction to the signal source is determined based on the multiple energy values and the multiple antenna directions. This is illustrated in FIG. 6E, which shows the updated anticipated direction 663b.

Steps 710 through 740 are repeated at step 745 using the updated anticipated direction (663b) to the signal source as the anticipated direction to the signal source. As steps 710 through 740 are repeated, new guiding icons are displayed on the display screen 623, one guiding icon at a time. The positions of the new guiding icons are shown in FIG. 6E as the guiding icons 664a-h. As was previously discussed, only one guiding icon is displayed at a time on the display screen, though in some embodiments more than one guiding icon can be displayed. In the example shown in FIG. 6E, the guiding icon 664a is the guiding icon that is displayed. Upon observing the displayed guiding icon 664a, the user of the communication device 610 moves the communication device 610 to align, on the display screen 623, the antenna direction indicator 661 with the guiding icon 664a. As shown, the calculation performed to generate the updated anticipated direction 663b results in the updated anticipated direction 663b being closer to the actual direction to the communication satellite 604a than is the initial anticipated direction 663a. In this manner, with each repetition of steps 710-740, the communication device 610 is able to zero-in on the actual direction to the communication satellite 604a, thereby ensuring an optimized communication link with the communication satellite.

As described earlier, the communication device instructs/guides the user to point the antenna in multiple directions that are offset from the anticipated direction of the signal source, as contrasted with systems that instruct/guide a user to point an antenna directly at an anticipated direction of the signal source. By instructing the user to point the antenna in multiple directions that are offset from the anticipated direction, the described system advantageously improves the pointing accuracy of the antenna in the direction of the signal source. Additionally, by continually and rapidly updating the anticipated direction of the signal source, the antenna pointing direction is less likely to drift away from the actual direction of the satellite and thereby lose the communication channel altogether.

In accordance with some embodiments, before step 735, the process shown in FIG. 7B includes waiting until the energy value of the signal received from the signal source surpasses a threshold value, or a predetermined time elapses, before continuing to step 735. In such embodiments, for each direction that the antenna points, the user is not instructed to point the antenna in a new direction until sufficient signal energy is received from the signal source given the current antenna pointing direction.

Figure 8:
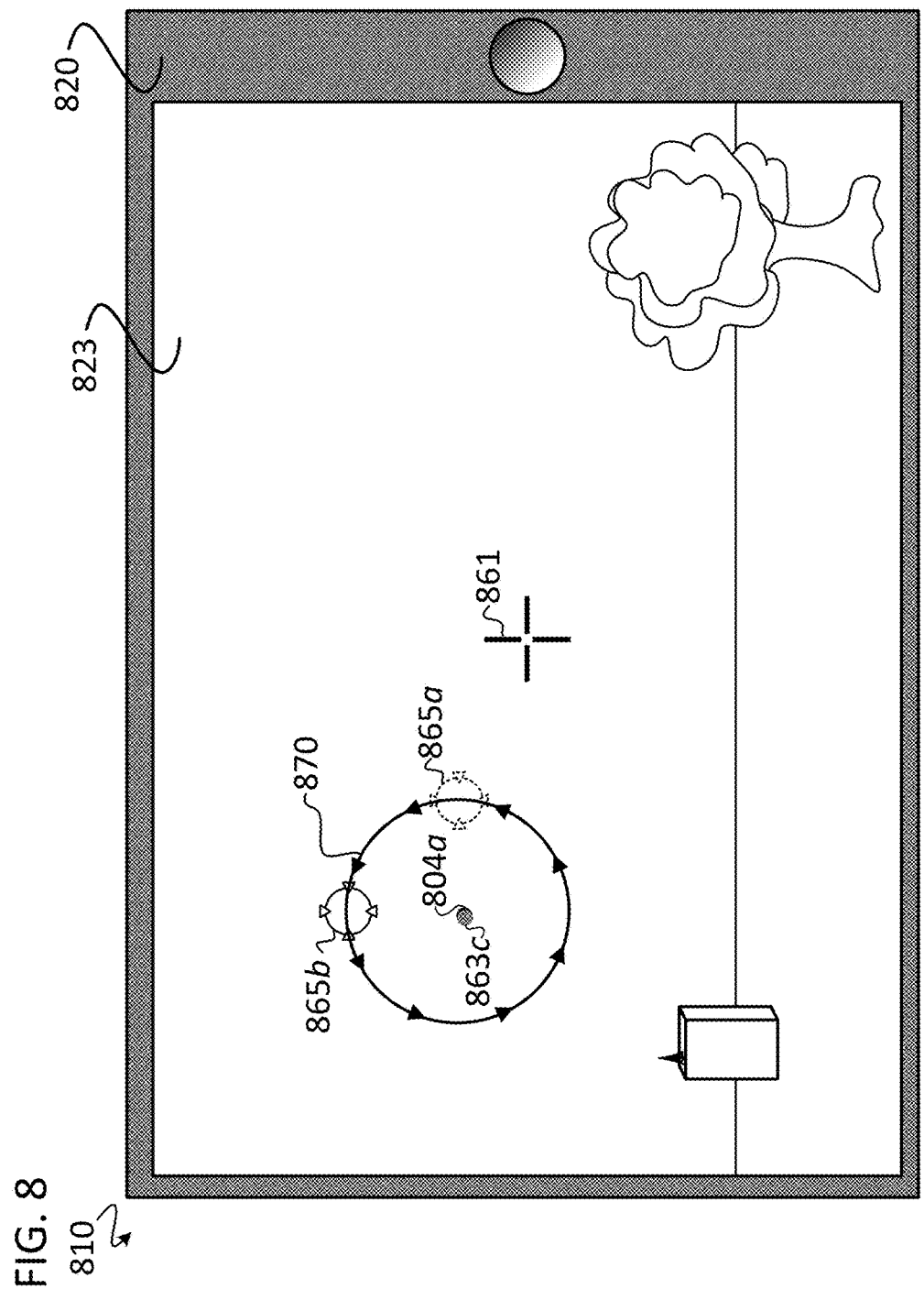
FIG. 8 is a simplified representation of the communication device shown in FIG. 4, in accordance with some embodiments.

FIG. 8, is a simplified representation of a communication device 810 that is the same or similar to the communication device 610 as described with reference to FIG. 6A. As shown, the communication device includes a user device 820 and a display screen 823. The display screen 823 displays video images similar to those described with reference to FIG. 6A and also displays a graphical overlay similar to the graphical overlay described with reference to FIG. 6A. The graphical overlay includes an antenna direction indicator 861, a guiding icon 865a and an updated guiding icon 865b. Also shown are an anticipated direction 863c, an actual direction to the communication satellite 804a, a path 870, and the guiding icon 865a (shown for illustration purposes, but not actually displayed on the display screen 823). Details of FIG. 8 are discussed with reference to FIG. 9.

Figure 9:
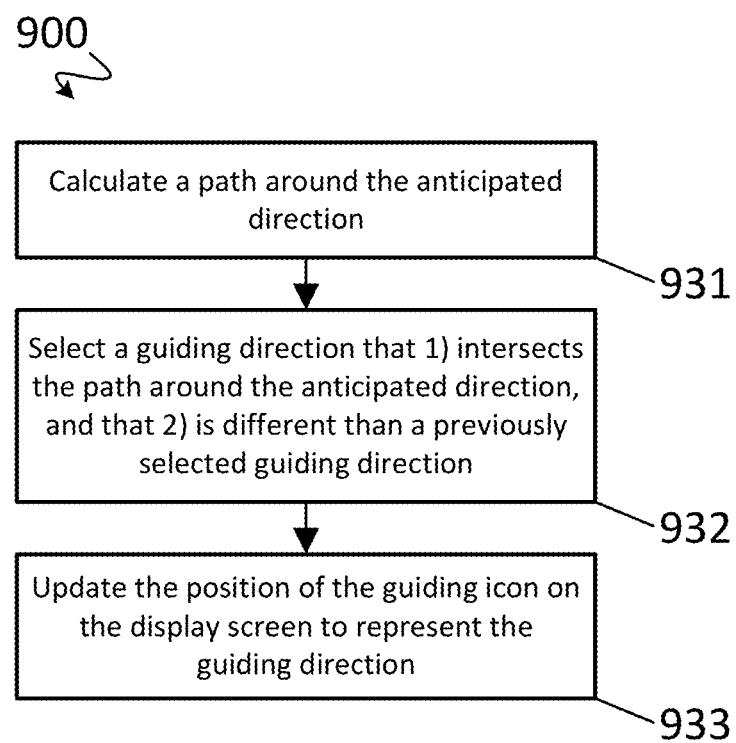
FIG. 9 is a simplified flowchart of an example process performed by the communication device shown in FIG. 4, in accordance with some embodiments.

FIG. 9 is a simplified flowchart of an example process 900 for updating a position of a guiding icon on a display screen based on an anticipated direction. Reference is made to FIG. 8. In some embodiments, the process 900 of FIG. 9 is included as part of the process of FIG. 7A, e.g., part of step 730. The particular steps, order of steps, and combination of steps are shown for illustrative and explanatory purposes only. Other embodiments may use different steps, orders of steps, and combinations of steps to perform similar functions.

At step 931, a path (shown in FIG. 8 as the path 870) around the anticipated direction 863c is calculated using the communication device 810. Though path 870 is circular, those of skill in the art will appreciate that the path around the anticipated direction 863c can be non-circular. In some embodiments, the radius of the path 870 changes depending on the state of signal acquisition. For instance, if signal acquisition of the communication is lost, the path 870 can be widened until the communication signal is reacquired. On the other hand, the path 870 can be made smaller when there is greater certainty that the anticipated direction 863c is close to the actual direction to the communication satellite 804a. Additionally, in some embodiments, the radius of the path 870 can be determined based on the magnitude of a previous direction correction delta used when updating the anticipated direction. In some embodiments, the path is a spiral or conical path. In other embodiments, the path is a Lissajous curve. In still other embodiments, the path follows a random or pseudorandom pattern. In any of the previously mentioned embodiments, the radius of the path can be adjusted between repetitions of the process steps shown in FIG. 7A and FIG. 7B. In accordance with yet another embodiment, the actual trajectory that the communication device follows is affected by possible shaking of the hand of the user who holds/moves the communication device.

At step 932, the communication device (e.g. 810 of FIG. 8) selects a guiding direction that 1) intersects the path (870) around the anticipated direction (863c), and 2) is different than a previously selected guiding direction. Then, at step 933, the communication device updates the position of the guiding icon (from the guiding icon 865a to the guiding icon 865b) on the display screen to represent the guiding direction.

As the antenna of a communication device is made to point in multiple directions, the communication device receives communication signals from a communication satellite. The communication device uses the received communication signals to determine energy values associated with the multiple positions.

Calculating a Minimum Energy Value and a Maximum Energy Value Based on Multiple Energy Values FIG. 10 shows a simplified representation of a communication device 1010 and a simplified scatter plot 1000 of multiple energy values 1001 determined as the communication device 1010 is pointed in multiple directions. The communication device 1010 is similar to the communication device 610 of FIG. 6A. As shown, energy values of the multiple energy values 1001 that are determined when the communication device 1010 points substantially closer to an actual direction of a communication satellite 1004a (as shown by a dimensional element 1077) are higher than energy values determined when the communication device 1010 points further away from the actual direction of the communication satellite 1004a (as shown by another dimensional element 1078).

After the multiple energy values 1001 have been determined by pointing the communication device in multiple directions, the multiple energy values 1001 and multiple directions are used to determine an updated anticipated direction to the signal source (e.g. the communication satellite). FIG. 11 is a simplified example process 1100 for determining the updated anticipated direction to a signal source based on multiple energy values and multiple antenna directions. In some embodiments, the process 1100 of FIG. 11 is part of step 740 of FIG. 7B. The particular steps, order of steps, and combination of steps are shown for illustrative and explanatory purposes only. Other embodiments may use different steps, orders of steps, and combinations of steps to perform similar functions.

As shown, at step 1141, the communication device calculates a minimum energy value and a maximum energy value based on the multiple energy values and the multiple antenna directions. At step 1142, the communication device calculates a direction correction delta (e.g. a correction factor) from the anticipated direction to the signal source using a difference between the minimum energy value and the maximum energy value. In some embodiments, the direction correction delta is proportional to a difference between the minimum energy value and the maximum energy value. Then, at step 1143, the communication device applies the direction correction delta to the anticipated direction to the signal source to generate the updated anticipated direction to the signal source.

In some embodiments, an equation/formula for calculating the direction correction delta (Δ) at step 1142 is expressed as:

$$\Delta = \beta \times (E_2 - E_1) \times (T_2 - T_1) \quad \text{(Equation 1)},$$

where beta (β) is a pre-determined coefficient, $E_1$ is the minimum determined energy value, $E_2$ is the maximum determined energy value, $T_1$ is an antenna direction corresponding to the minimum determined energy value, and $T_2$ is an antenna direction corresponding to the maximum determined energy value. In some embodiments, beta is used as a "gain/attenuation" parameter used to ensure that updates made to the anticipated direction are not unacceptably small and are not unacceptably large. For example, beta may be a value greater than zero and less than one. In other embodiments, beta may be a value that is less than zero.

In some embodiments, an equation/formula for applying the direction correction delta to the anticipated direction at step 1182 is expressed as:

$$S_2 = S_1 + \Delta \quad \text{(Equation 2)},$$

where the direction correction delta (Δ) is from equation 1, $S_1$ is the anticipated direction to the signal source, and $S_2$ is the updated anticipated direction to the signal source.

The communication device (e.g. the communication device 410 of FIG. 4) is held by a user instead of being adjustably mounted on a fixed base, and the direction that the communication device points is controlled by movements made by the user. Thus, the direction that the communication device points is subject to involuntary movement by the user (e.g. muscle tremors, instability, inaccurate pointing, etc.). However, such involuntary movement may be similar to the general rotation or "wobble" of the antenna direction described above, and as such is not necessarily a problem.

Due to non-idealities or design trade-offs, the antenna lobe may have a shape that diverges from an ideal shape. For example, in some embodiments, the main lobe of an antenna (e.g. the antenna 441 of FIG. 4) of the communication device may be substantially flat in a region (e.g. the antenna gain falls off differently on the top of the lobe versus on the sides of the lobe). Additionally, due to pointing inaccuracies made by the user of the communication device, there may be sections along the path (e.g. path 870 of FIG. 8) around the anticipated location where no data has been collected. Thus, in some embodiments, a curve fitting algorithm is used to interpolate, extrapolate and/or filter the data to identify the minimum energy value and the maximum energy value of the collected energy values.

Figure 12A:
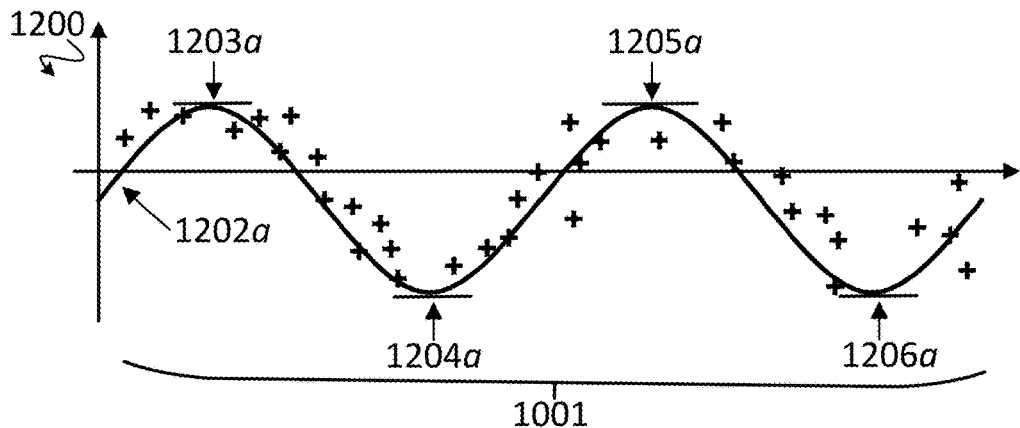
FIG. 12A-C are simplified plots of lines fitted to multiple energy values, in accordance with some embodiments.

FIG. 12A is a simplified plot 1200 of a sinusoid 1202a fitted to the multiple energy values 1001 that were determined as a communication device was pointed in multiple directions. As shown, the sinusoid 1202a has local maximums at point 1203a and at point 1205a. The sinusoid 1202a has local minimums at point 1204a and at point 1206a. Details of FIG. 12A are discussed with reference to FIG. 13.

Figure 12B:
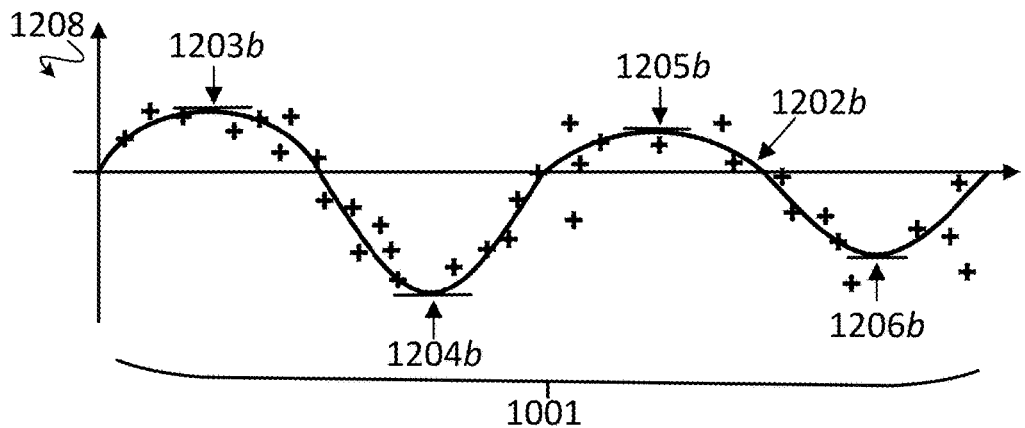

FIG. 12B shows a simplified plot 1208 of a distorted (e.g. non-ideal) sinusoid 1202b fitted to the multiple energy values 1001 that were determined as a communication device was pointed in multiple directions. As shown, the distorted sinusoid 1202b has local maximums at the point 1203b and at point 1205b. The distorted sinusoid 1202b has local minimums at the point 1204b and at point 1206b. Details of FIG. 12B are discussed with reference to FIG. 13.

Figure 12C:
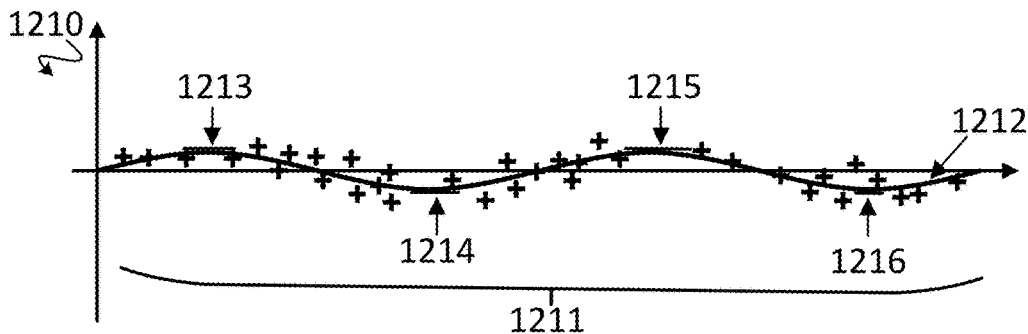

FIG. 12C shows a simplified plot 1210 of a sinusoid 1212 fitted to multiple energy values 1211 that were determined as a communication device (that is similar to the communication device 410 of FIG. 4) was pointed in multiple directions. As shown, the sinusoid 1212 has local maximums at point 1213 and at point 1215. The sinusoid 1212 has local minimums at point 1214 and at point 1216. Details of FIG. 12C are discussed with reference to FIG. 13.

Figure 13:
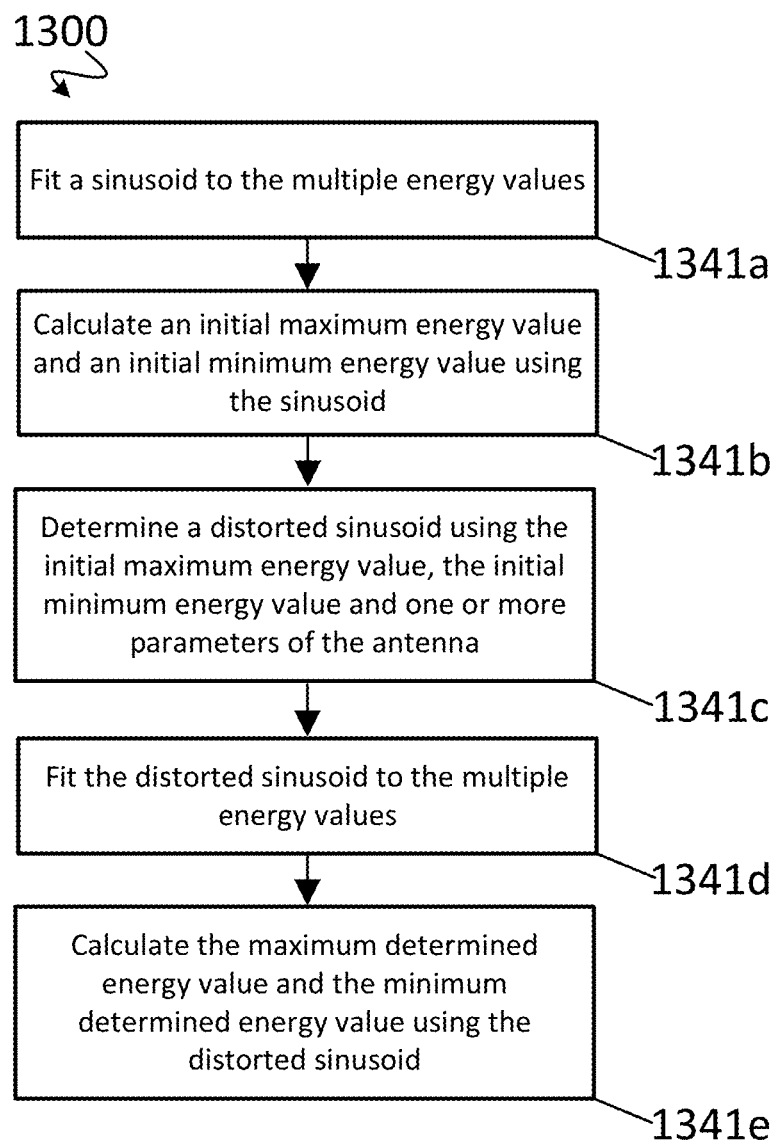
FIG. 13 is a simplified flowchart of an example process performed by the communication device shown in FIG. 4, in accordance with some embodiments.

FIG. 13 is a simplified flowchart of an example process for calculating a minimum energy value and a maximum energy value based on multiple energy values and multiple antenna directions. In some embodiments, the process of FIG. 13 includes a curve fitting algorithm. In such embodiments, the calculated minimum energy value and the calculated maximum value are determined using a line that has been fitted to the multiple energy values rather than using the multiple energy values directly. In some embodiments, the curve fitting algorithm is included as part of step 1141 of FIG. 11. In some embodiments, the steps of FIG. 13 are stored in the memory 424 of the user device 420 and carried out by the processor(s) 425 of the user device 420. FIG. 13 is discussed with reference to FIGS. 12A-C. The particular steps, order of steps, and combination of steps are shown for illustrative and explanatory purposes only. Other embodiments may use different steps, orders of steps, and combinations of steps to perform similar functions.

At step 1341a, the communication device fits a sinusoid to the multiple energy values. In some embodiments, the sinusoid is a non-distorted sinusoid. This is illustrated as part of FIG. 12A, which shows the sinusoid 1202a that has been fitted to the multiple energy values 1001.

Then, at step 1341b, the communication device calculates an initial maximum energy value and an initial minimum energy value using the sinusoid. With reference to FIG. 12A, the points 1203a, 1204a, 1205a and 1206a are calculated using the sinusoid 1202a. As shown, the local maximums of the sinusoid 1202a are equal in amplitude (the point 1203a and the point 1205*a*). Likewise, the local minimums of the sinusoid 1202*a* are equal in amplitude (the point 1204*a* and the point 1206*a*). Thus, the initial maximum energy value can be calculated to be the amplitude of either point.

At step 1341*c*, the communication device calculates a distorted sinusoid using the initial maximum energy value, the initial minimum energy value and one or more parameters of the antenna (e.g. a characterization of lobe shape). Then, at step 1341*d*, the communication device fits the distorted sinusoid to the multiple energy values. This is illustrated as part of FIG. 12B, which shows the distorted sinusoid 1202*b* which has been fitted to the multiple energy values 1001. As was previously discussed, in some embodiments, the main lobe of the antenna (e.g. the main lobe 551 of the antenna 541 of FIG. 5) is non-linear. Because of such non-linearity, in some embodiments a distorted sinusoid (e.g. the distorted sinusoid 1202*b*) provides a more accurate fit to the energy values than an ideal sinusoid (e.g. the sinusoid 1202*a*). Curve fitting with either the sinusoid 1202*a* and/or the distorted sinusoid 1202*b* can be repeated either a predetermined number of times or until the cumulative error of the curve fitting is below a predetermined value.

At step 1341*e*, the communication device calculates the maximum determined energy value and the minimum determined energy value using the distorted sinusoid. With reference again to FIG. 12B, the points 1203*b*, 1204*b*, 1205*b* and 1206*b* are calculated using the distorted sinusoid 1202*b*. The maximum determined energy value in this example is calculated to be the energy value corresponding to the point 1203*b*. The minimum determined energy value in this example is calculated to be the energy value corresponding to the point 1204*b*.

With reference to FIG. 12C, as an anticipated direction to a signal source becomes substantially the same as an actual direction to the signal source (e.g. after one or more iterations of the steps described with reference to FIG. 7A and FIG. 7B), the sinusoid 1212 that is fitted to the multiple energy values 1211 will have a diminished amplitude. Thus, the maximum determined energy level and the minimum determined energy level will result in a smaller direction correction delta when used in equation 1.

Additional Aspects

Figure 14:
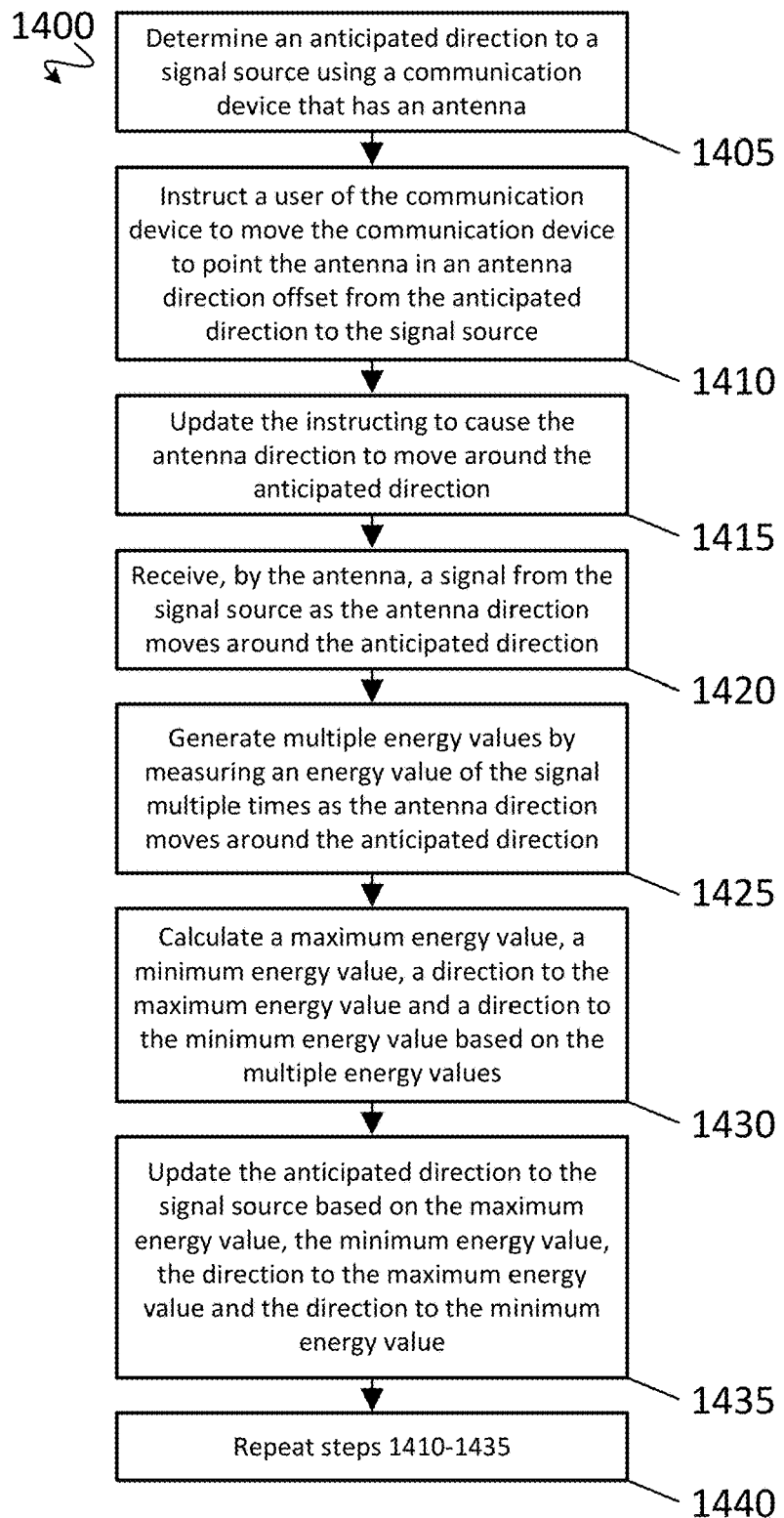
FIG. 14 is a simplified flowchart of an example process performed by the communication device shown in FIG. 4, in accordance with some embodiments.

FIG. 14 is a simplified flowchart of an example adaptive process 1400 for pointing an antenna in the direction of a signal source, in accordance with some embodiments. In some embodiments, the steps of FIG. 14 are stored in the memory 424 of the user device 420 and carried out by the processor(s) 425 of the user device 420. The particular steps, order of steps, and combination of steps are shown for illustrative and explanatory purposes only. Other embodiments may use different steps, orders of steps, and combinations of steps to perform similar functions.

At step 1405, the communication device (e.g., 410) determines an anticipated direction to a signal source (e.g., 104*a*) using a communication device that has an antenna (e.g., 141). At step 1410, the communication device instructs a user of the communication device to move the communication device to point the antenna in an antenna directional offset from the anticipated direction to the signal source (the antenna direction is the direction that the antenna is pointing). At step 1415, the communication device updates the instructing to cause the antenna direction to be moved around the anticipated direction, as described above. That is, having observed the instructing, and in response to the instructing, the user moves the communication device 410 to point the antenna in a new direction. At step 1420, the communication device receives, by the antenna, a signal from the signal source as the antenna direction moves (e.g. is moved by the user 105 of FIG. 1) around the anticipated direction. At step 1425, the communication device generates multiple received energy values by measuring, by the communication device, a received energy value of the signal multiple times as the antenna direction moves (e.g. is moved by the user 105) around the anticipated direction. At step 1430, the communication device calculates a maximum energy value, a minimum energy value, a direction to the maximum energy value and a direction to the minimum energy value based on the multiple energy values, as described above. The calculation of the minimum and maximum received power values may include using a curve fitting algorithm as previously described. At step 1435, the communication device updates the anticipated direction to the signal source based on the maximum energy value, the minimum energy value, the direction to the maximum energy value and the direction to the minimum energy value. Then, at step 1440, steps 1410-1435 are repeated.

In some embodiments, the instructing of step 1410 includes one, or a combination of: audio instructions, non-video instructions, haptic feedback, or other methods of instructing as are known in the art. That is, although embodiments have been described as including a video image as part of the augmented reality display, those skilled in the art will appreciate that described processes are operable without utilizing a camera.

Avoiding Transmission in the Direction of an Unintended Receiver

Communication devices, similar to the communication device 410 of FIG. 4, may operate in an environment that includes incumbent receivers/transceivers (e.g. line-of-sight microwave transceivers) which operate in the same frequency band as the communication device. Governmental regulations may strictly prohibit a user of the communication device from transmitting signals in a direction, and at a power, which would cause receiver portions of the incumbent transceivers to receive interfering signal energy (e.g. signal energy that is above the noise floor). In order to avoid violating governmental regulations, a user of the communication device must either abstain from transmitting signals entirely when in such an environment, or point the communication device in a direction that allows the communication device to exchange signals with an intended transceiver (e.g. a communication satellite) while avoiding transmitting substantially in the direction of the incumbent transceiver (an unintended receiver).

In some embodiments, in order for the user to point the communication device in a direction such that the intended receiver can properly receive communication signals while signal energy transmitted from the communication device to an intended transceiver does not interfere with an unintended incumbent receiver/transceiver, a "desired direction" is first determined. When the antenna of the communication device is pointed in the desired direction, a link budget between the communication device and the intended transceiver is above an acceptable threshold value (e.g. a sufficient level to exchange communication information), and a link budget between the communication device and the unintended incumbent receiver/transceiver is below an acceptable threshold value (e.g. below the noise floor). Thus, when pointed in the desired direction, the communication device can transmit signals to the intended transceiver without interfering with unintended receivers.

In some embodiments, energy levels of signals received by the communication device antenna when pointed in various pointing directions around the desired direction are estimated. Then, a user of the communication device is instructed to move the communication device while signal energy levels received from the intended transceiver (e.g. a communication satellite) continue to be measured using the antenna of the communication device. The measured energy levels may be compared to the estimated energy levels and results of the comparison are used to guide/instruct the user to move the communication device in a direction to cause some aspects of the measured energy levels and the estimated energy levels to match or coincide.

By way of example, a simplified environment 1500, shown in FIG. 15A, includes a communication device 1510, a terrestrial transceiver 1503 (i.e. an unintended receiver) and a communication satellite 1504 (i.e. an intended transceiver). The communication satellite 1504 is similar to the communication satellite 104a of FIG. 1, and the terrestrial transceiver 1503 is similar to the terrestrial transceiver 103a. The communication device 1510 is similar to the communication device 410 of FIG. 4 and includes an antenna 1541, a camera 1521, as well as other modules (not shown) as were described with reference to the communication device 410. Also, shown is an antenna boresight direction 1580a, and a simplified main lobe 1551 of the antenna 1541. Sidelobes of the antenna 1541 are not shown for simplicity.

The terrestrial transceiver 1503 includes a receiver portion that is able to receive signals within the same frequency band and polarity as those transmitted by the communication device 1510. However, the communication device 1510 may not be authorized to cause signal energy above a predetermined threshold value, such as the noise floor or a minimum detectable signal value, to be received at the receiver portion of the terrestrial transceiver 1503. Thus, the terrestrial transceiver 1503 is an example of an unintended receiver. The communication device 1510 is authorized to cause signals to be received at a receiver portion of the communication satellite 1504 and is also authorized to receive signals that are transmitted by the communication satellite 1504. Thus, the communication satellite 1504 is an example of an intended transceiver. Though the above embodiment is described with respect to a terrestrial unintended incumbent receiver, those skilled in the art will recognize that the systems and methods disclosed herein also apply to situations where the unintended receivers are other satellites or receivers mounted on manned or unmanned aerial vehicles.

In the example shown, the antenna boresight direction 1580a points substantially in the direction of the communication satellite 1504 (as indicated by the intersection of the simplified main lobe 1551 with a dashed circle drawn around the communication satellite 1504). A first link budget between the communication device 1510 and the communication satellite 1504 is above a first acceptable threshold value and communication information can be exchanged between the communication device 1510 and the communication satellite 1504 with acceptable fidelity. However, a second link budget between the communication device 1510 and the terrestrial transceiver 1503 is not below a second acceptable threshold value (e.g. the second link budget is above the noise floor of the receiver portion of the terrestrial transceiver 1503). Thus, the simplified main lobe 1551 is unacceptably pointed in the direction of the terrestrial transceiver 1503, as indicated by the intersection of the simplified main lobe 1551 with a dashed circle drawn around the terrestrial transceiver 1503. In this scenario, a user of the communication device 1510 must abstain from transmitting a signal or change the direction that the antenna 1541 of the communication device 1510 is pointing until the second link budget is below the second acceptable threshold value. It should be noted that for an optimal communication device antenna pointing direction to exist, both a proper link budget towards the intended transceiver (above a first threshold), as well as a proper link budget towards unintended receivers (below a second threshold) must exist. If either one of these conditions is not met, the intended transceiver is deemed to be unavailable and transmission from the communication device towards that intended transceiver is disabled.

Figure 15B:
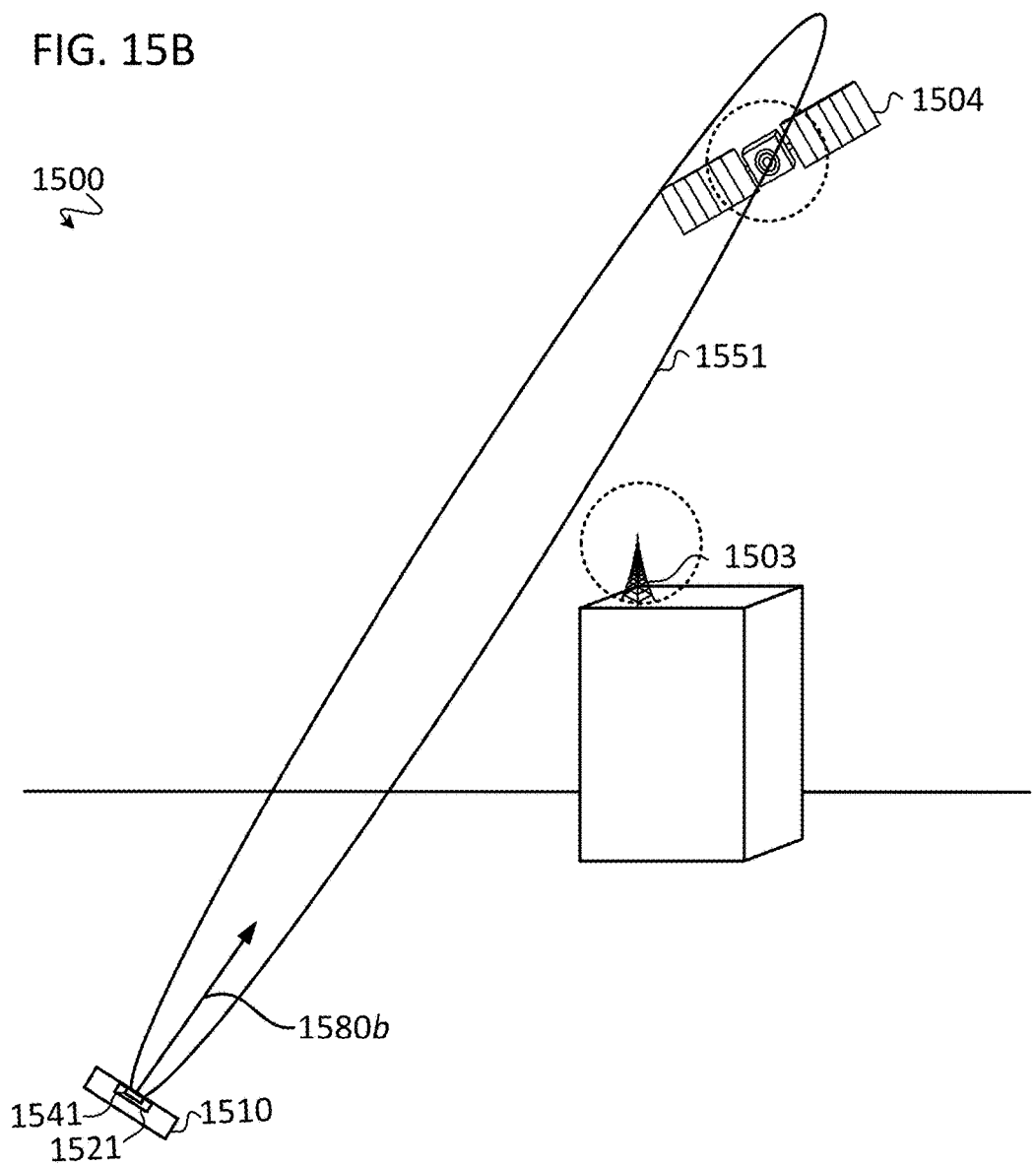

FIG. 15B shows the antenna 1541 pointing in a second antenna boresight direction 1580b. The second antenna boresight direction is in the "desired direction". Thus, the first link budget remains above the first acceptable threshold value, the second link budget is now below the second acceptable threshold value, and signals can be acceptably transmitted from the communication device 1510 to the communication satellite 1504 without interfering with the unintended receiver 1503.

FIGS. 16A-C show a simplified representation of a communication device 1610 that is the same or similar to the communication device 410 of FIG. 4 and/or the communication device 610 of FIG. 6. The communication device 1610 includes a user device 1620, a display screen 1623, as well as modules (not shown) similar to those of the communication device 410/610. The display screen 1623 displays an antenna direction indicator 1661 and a video image, captured by a camera (e.g. 621) of the communication device 1610. The video image includes a representation of a terrestrial transceiver 1603 (an incumbent transceiver). Additionally, an actual direction of a communication satellite 1604 (an intended transceiver), an angle reference guide 1666, and a desired direction 1673 (of FIG. 16C) are provided for illustration only and are not displayed on the display screen 1623. Details of FIGS. 16A-C are discussed with reference to FIGS. 17A-C.

Figure 16E:
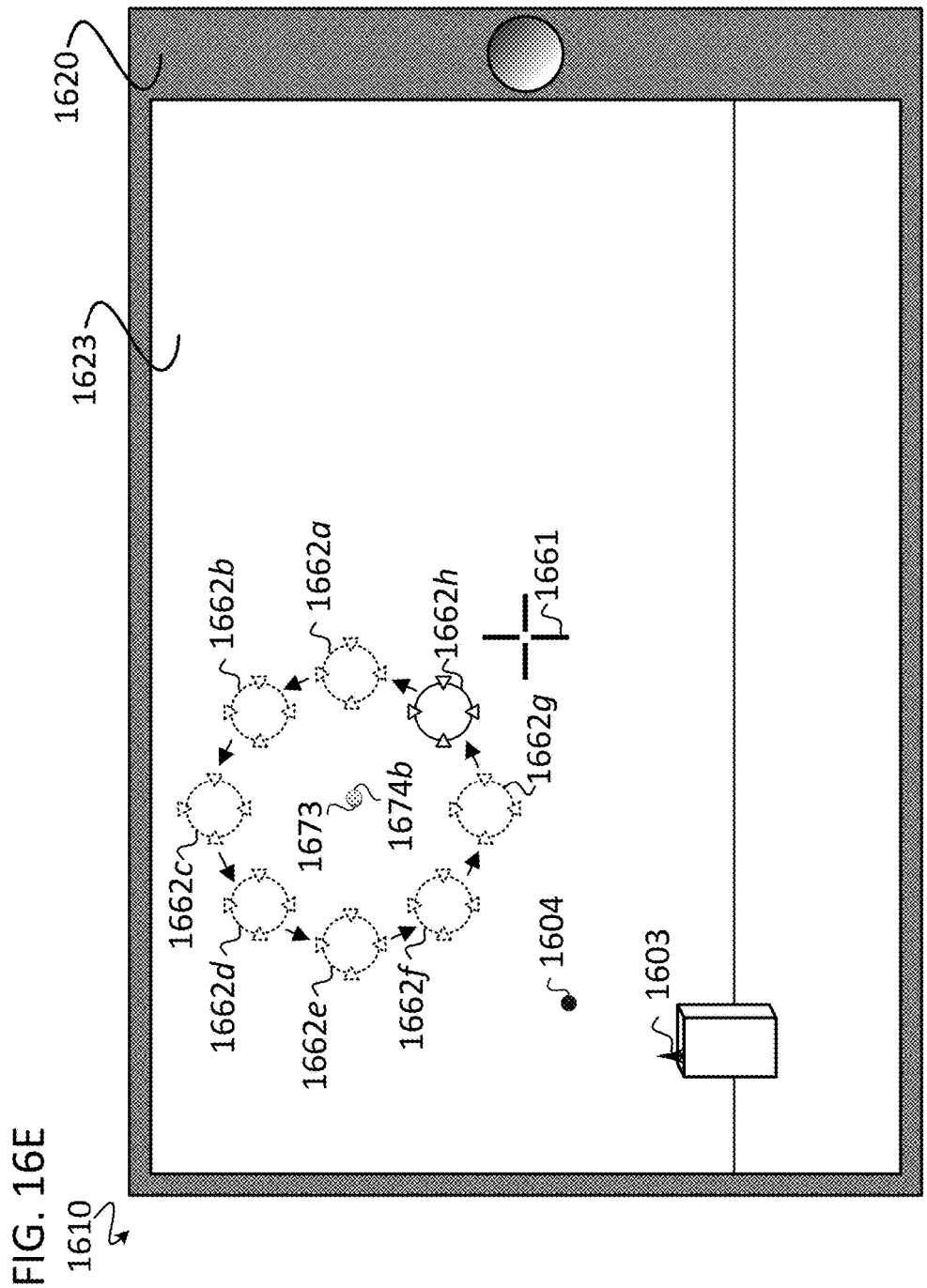

FIGS. 16D-E show a simplified representation of the communication device 1610, the user device 1620, the display screen 1623, the antenna direction indicator 1661, and the terrestrial transceiver 1603. The display screen 1623 additionally displays a guiding icon 1662h. The actual direction of the communication satellite 1604, a camera 1621 (similar to the camera 621), an antenna 1641 (similar to the antenna 641), a desired direction 1673, an anticipated direction 1674a and previous/future guiding icons 1662a-g are provided for illustration only and are not displayed on the display screen 1623. Details of FIGS. 16D-E are discussed with reference to FIGS. 18-23. The anticipated direction 1674a may have some unintentional offset from the desired direction 1673 due to inaccuracies in the sensors in the communication device 1610.

As was discussed previously, in some embodiments, a user of the communication device 1610 is instructed to move the communication device 1610 while the received signal energy is measured by the antenna 1641 of the communication device 1610 (and specifically by the associated receiver, e.g., the transceiver module 442) in multiple directions. The measured energy levels are then compared to estimated energy levels (corresponding to the desired direction), or to energy parameters associated with the desired direction 1673, and results of the comparison are used to guide/instruct the user to move the communication device 1610 in a direction such that some aspects of the measured energy levels and the estimated energy levels are caused to match or coincide.

Figure 17A:
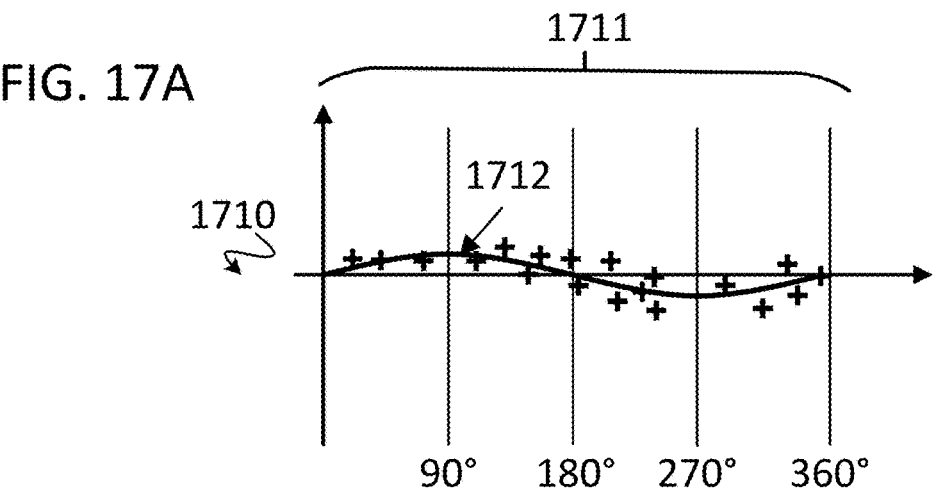
FIG. 17A-C are simplified plots of lines fitted to multiple energy values, in accordance with some embodiments.

Example measured energy levels are shown in FIG. 17A, which is a simplified plot 1710 of a sinusoid 1712 fitted to the multiple energy values 1711 which were measured as a communication device 1610 was pointed in multiple directions (e.g. around an anticipated or desired direction). The multiple measured energy values 1711 correspond to energy values measured by the communication device 1610 with reference to FIG. 16A. As shown in FIG. 16A, the actual direction of the communication satellite 1604 is substantially in the center of the angle reference guide 1666, resulting in a low amplitude for the sinusoid 1712. That is, when pointed substantially in the direction of the communication satellite, minor angular deviations of the communication device 1610 do not result in significant deviations in received signal energy/power.

In the example presented, when the communication device 1610 is substantially pointed in the direction of the communication satellite (towards the actual direction of the communication satellite 1604), a link budget between the communication device 1610 and the terrestrial transceiver 1603 is also above a predetermined threshold value. Thus, the communication device 1610 must either abstain from transmitting a signal, or be pointed in another direction (e.g. the desired direction) before transmitting the signal. In the example presented, the desired direction is at the same elevation as the direction to the communication satellite and 10 degrees to the right of the communication satellite. However, any other appropriate angle offset (in a vertical and/or horizontal direction) may be used.

In some embodiments, if the current pointing direction is known and the desired direction is known, a user of the communication device can be guided/instructed to point the communication device in the desired direction, and the user will then be guided to "wobble" the pointing direction of the communication device 1610 around the desired direction. In other embodiments, because the exact direction at which the antenna 1641 boresight points may not be known, or the location of the communication satellite is changing, the user may be instructed/guided to point the communication device 1610 in multiple directions in order to adaptively converge on an antenna direction that is substantially in the desired direction.

Figure 17B:
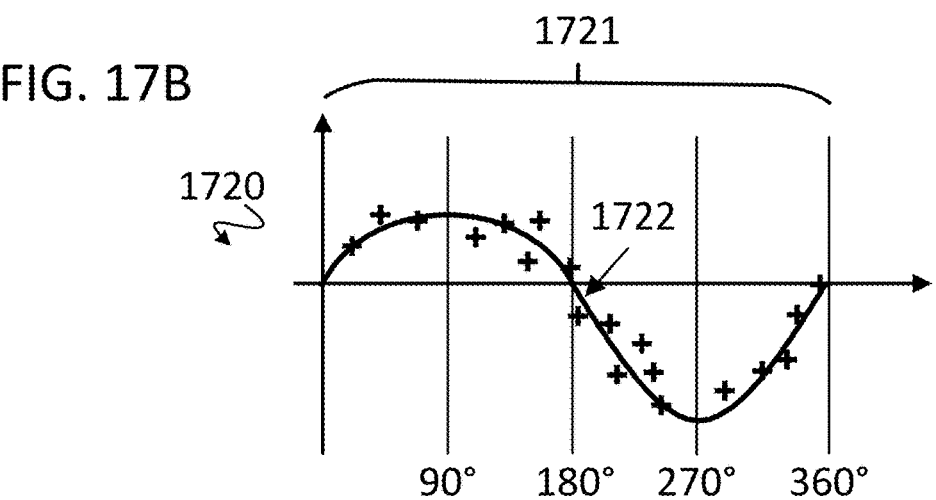

With reference to FIG. 16B, FIG. 17B is a simplified plot 1720 of a sinusoid 1722 fitted to multiple (measured) energy values 1721 that were determined as the communication device 1610 was pointed in multiple directions. As shown in FIG. 16B, the actual direction of the communication satellite 1604 is close to the 90-degree mark of the angle reference guide 1666. Correspondingly, the sinusoid 1722 has a peak amplitude at 90-degrees.

In the example presented, a user of the communication device 1610 is instructed/guided (either directly or iteratively) to move the communication device 1610 to point in a desired direction corresponding to 180-degrees relative to the antenna boresight. In some embodiments, an estimated power curve (or vector of values) of estimated signal energy is generated to facilitate the instructing/guiding. The estimated power curve is an estimation of a measured energy/power curve that would be generated if the communication device was "wobbled" around the desired direction. In some embodiments, the estimated power curve is a distorted sinusoid (corresponding to gain characteristics of the main lobe of the antenna of the communication device 1610).

In accordance with some embodiments, parameters of the estimated signal energy are calculated. Such parameters include one or more of the angle at which the energy extremum (i.e., the maximum or minimum peak) is expected and a ratio between the amplitude extrema of the distorted sinusoidal, e.g. a "positive" peak amplitude (e.g. the maximum received energy value) of the sinusoid 1722 above the horizontal axis, and a "negative" peak amplitude (e.g. the minimum received energy value) of the sinusoid 1722 below the horizontal axis.

Figure 17C:
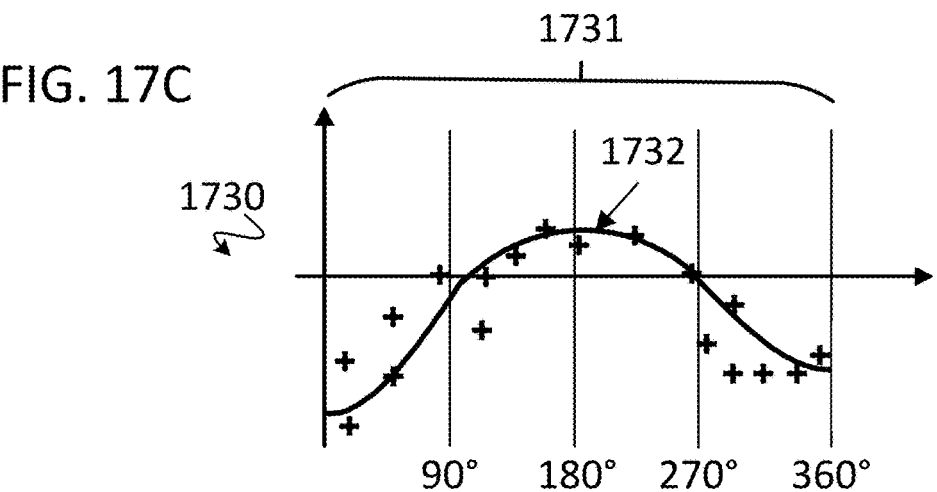

With reference to FIG. 16C, if the antenna direction of the communication device 1610 is wobbled (pointed in multiple directions) substantially in a direction around the desired direction 1673, a peak of a sinusoid fitted to measured signal energy values will occur at 180-degrees. This is illustrated in FIG. 17C, which is a simplified plot 1730 of a sinusoid 1732 fitted to the multiple energy values 1731 that were measured as the communication device 1610 was pointed in multiple directions around the desired direction 1673. Corresponding to FIG. 16C, the sinusoid 1732 has a peak amplitude at 180 degrees. Thus, the communication device 1610 determines that it is pointed substantially in the desired direction. For simplicity, the energy curves of FIGS. 17A-C are illustrated with a horizontal axis bisecting the sinusoids 1712, 1722 and 1732. However, all of the multiple energy values 1711, 1721 and 1731 are positive energy values.

Figure 18:
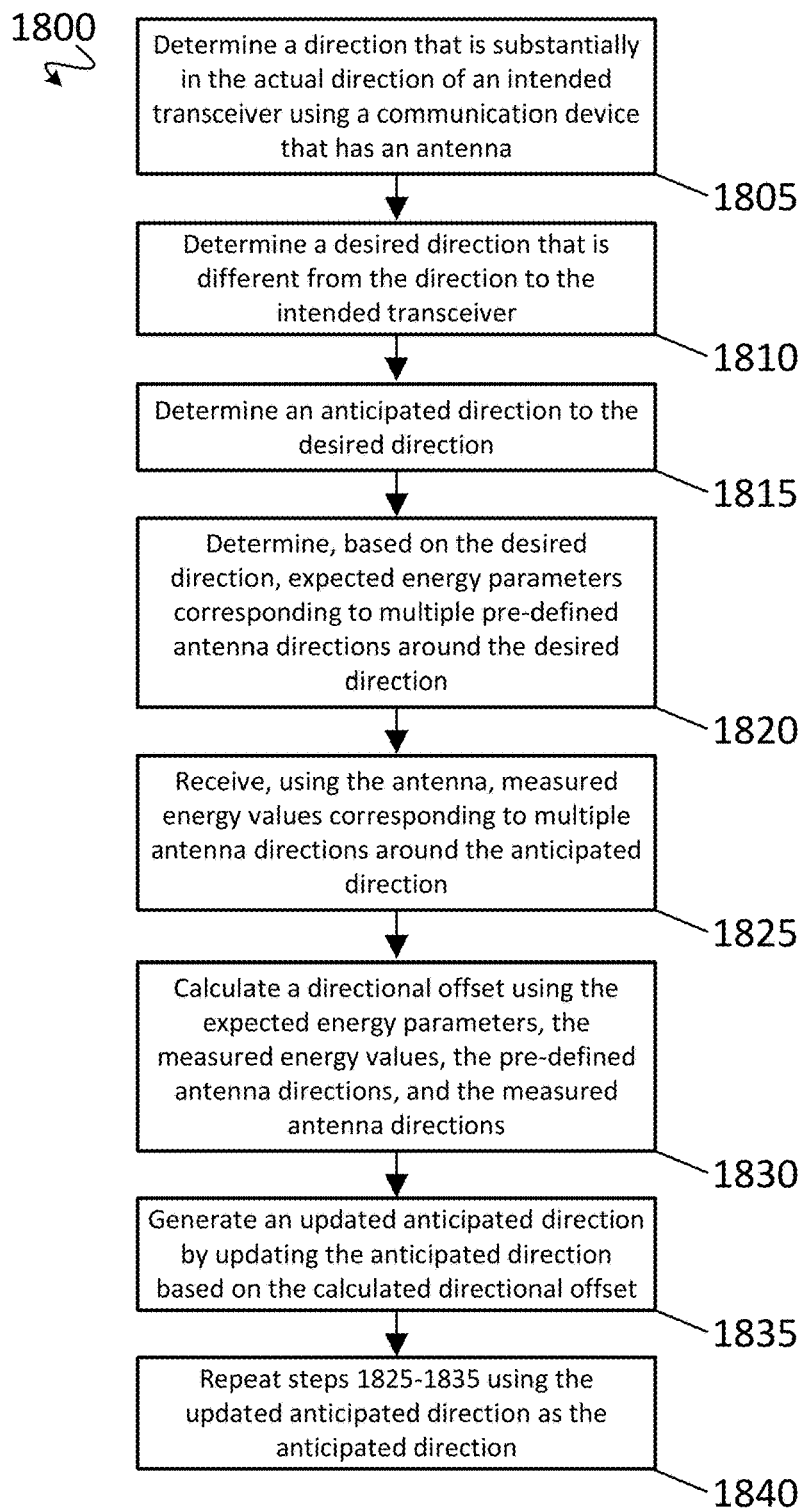
FIG. 18 is a simplified flowchart of an example process performed by the communication device shown in FIG. 4, in accordance with some embodiments.

A simplified flowchart of an example process 1800 for selectively controlling a direction of signal transmission is shown in FIG. 18. Reference is made to FIGS. 16A-D and FIGS. 17A-C. The particular steps, order of steps, and combination of steps are shown for illustrative and explanatory purposes only. Other embodiments may use different steps, orders of steps, and combinations of steps to perform similar functions.

At step 1805, with reference to FIG. 16D, a direction is determined that is substantially in the actual direction of an intended transceiver (e.g. the actual direction to the communication satellite 1604) using a communication device 1610 that has an antenna 1641. In some embodiments, after step 1805, the example process 1800 includes a step of waiting until the communication device 1610 has data to transmit before proceeding to step 1810.

At step 1810, a desired direction 1673 is determined that is different from the direction to the intended transceiver. The desired direction 1673 is often different than the actual direction to the communication satellite 1604. At step 1815, an anticipated direction 1674a to the desired direction 1673 is determined. The anticipated direction 1674a may be any direction towards the communication satellite 1604 whereby the communication device 1610 can acquire the communication satellite 1604 (that is, any direction in which the communication device 1610 receives a signal with energy above a first threshold). At step 1820, expected energy parameters (e.g. normalized signal energy/power levels) are determined, based on the desired direction 1673, which correspond to multiple pre-defined antenna directions around the desired direction 1673. In some embodiments, for each antenna direction of the multiple pre-defined antenna directions, an expected link budget value of signal energy/power value is determined using that antenna direction, characteristics of the intended transceiver, characteristics of the antenna of the intended transceiver, and characteristics of the antenna 1641 of the communication device 1610. Link budget is a function of the gain and antenna lobe pattern of the antenna 1641 of the communication device 1610, the gain and antenna lobe pattern of an antenna of the intended transceiver, as well as the distance between the communication device 1610 and the intended transceiver. In some embodiments, the characteristics of the intended transceiver include one or more of a position of the intended transceiver relative to the communication device 1610, a gain pattern of an antenna of the intended transceiver, and a transmission signal power of the intended transceiver. In some embodiments, the characteristics of the antenna 1641 of the communication device 1610 include a gain pattern of the antenna 1641 and antenna lobe characteristics of the antenna 1641.

At step 1825, measured energy values are received (e.g. the multiple energy values 1711, 1721 or 1731 of FIGS. 17A-C), using the antenna 1641. The measured energy values correspond to multiple antenna 1641 directions around the anticipated direction 1674*a*. In some embodiments, the multiple energy values are measured as the antenna 1641 is caused to be moved by a user moving the communication device 1610 to follow the guiding icons 1662*a-h*.

At step 1830, a directional offset is calculated using the expected energy parameters and the measured energy values. In general, the directional offset represents a step or change in angle towards the desired direction 1673 from the anticipated direction 1674*a*. With reference to FIG. 16E, at step 1835, an updated anticipated direction 1674*b* is generated by updating the anticipated direction (1674*a* of FIG. 16D) based on the calculated directional offset. The updated anticipated direction is determined by modifying the direction in which the antenna 1641 is pointing (its boresight) to point in a direction that would minimize the difference between the measured received power energy curve and the anticipated/estimated energy curve. In accordance with some embodiments, the updated anticipated direction is determined by modifying the direction in which the antenna 1641 is pointing to point in a direction that would minimize the difference between parameters of the measured received energy curve and the parameters of the estimated/anticipated energy curve. As discussed above, an example of the estimated power curve parameters may include, but are not limited to, the angle in which the curve peaks, the angle in which the curve has its minimum, and the ratio between the "positive" and "negative" amplitudes.

At step 1840, steps 1825-1835 are repeated using the updated anticipated direction (1674*b*) as the anticipated direction. In this manner, the anticipated direction 1674*a-b* is caused to converge on the desired direction 1673, as indicated in FIG. 16E.

Figure 19:
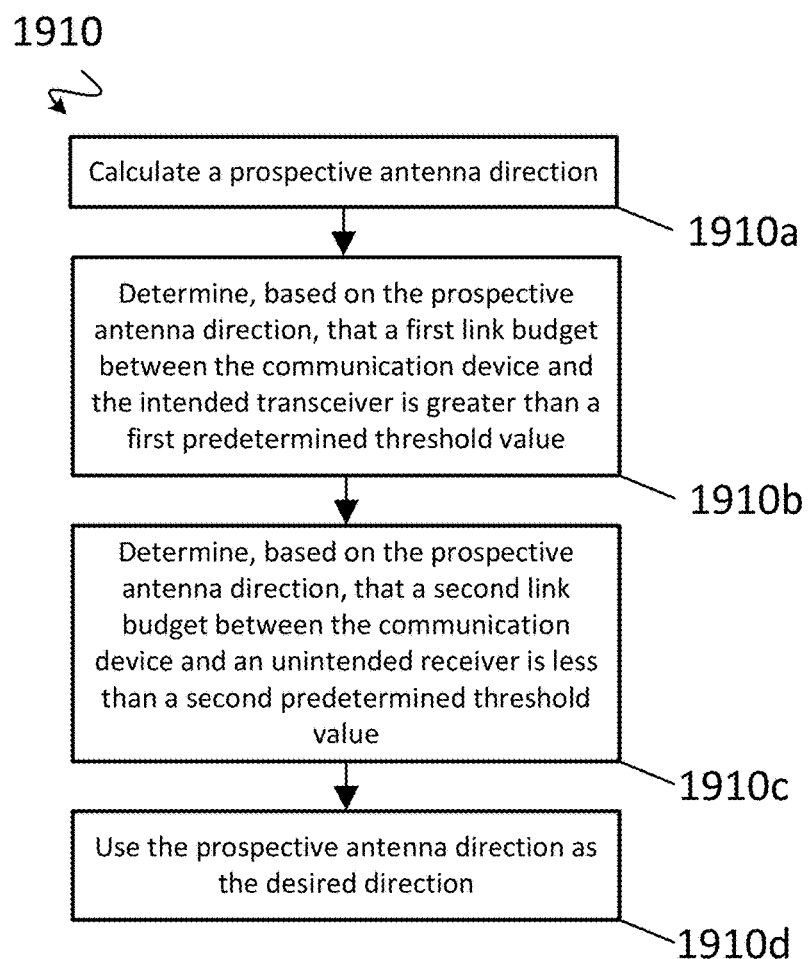
FIG. 19 is a simplified flowchart of an example process performed by the communication device shown in FIG. 4, in accordance with some embodiments.

An example process 1910 of FIG. 19 includes steps for determining a desired direction 1673 that is different from the direction to the intended transceiver (e.g. a communication satellite). These steps can occur as part of step 1810 of the process 1800. At step 1910*a*, with reference to FIG. 15A, in some embodiments, a prospective antenna direction for the antenna 1641 is selected or calculated using: (i) a direction to the intended transceiver (e.g. 1504) relative to a boresight 1580*a* of the antenna 1541 of the communication device 1510, (ii) a direction to the unintended receiver 1503 relative to the boresight 1580*a* of the antenna 1541 of the communication device 1510, (iii) characteristics of the intended transceiver 1504, (iv) characteristics of the unintended receiver 1503, (v) a direction in which the antenna of the intended transceiver 1504 points, and (vi) a direction in which the antenna of the unintended receiver 1503 points. At step 1910*b*, it is determined, based on the prospective antenna direction, that a first link budget between the communication device 1610 and the intended transceiver is greater than a first predetermined threshold value (e.g., determined by the sensitivity of the communication device 1510). At step 1910*c*, it is determined, based on the prospective antenna direction, that a second link budget between the communication device 1610 and an unintended receiver (the incumbent transceiver 1603) is less than a second predetermined threshold value. If the determination at either step 1910*b* or 1910*c* is false, then the process 1910 returns to 1910*a* to select a different prospective antenna direction, based on the current prospective antenna direction and the first and/or second link budgets. Then, at step 1910*d*, the prospective antenna direction is used as the desired direction. In some embodiments, the desired direction is selected as to maximize the link budget towards the intended transceiver while keeping the link budget towards all unintended receivers below a second threshold. If the system cannot find a direction that satisfies both conditions (being above first threshold towards the intended transceiver and being below a second threshold towards all other unintended receivers, then a desired direction does not exist and the intended transceiver is marked as unavailable.

Figure 20:
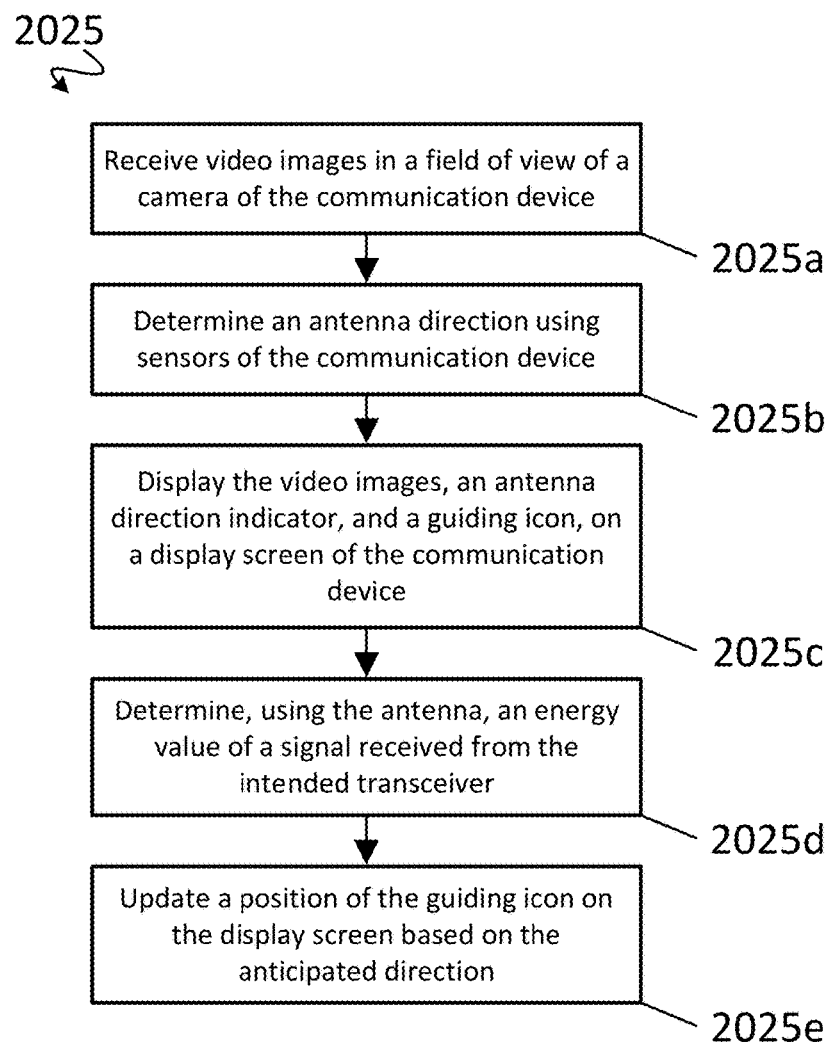
FIG. 20 is a simplified flowchart of an example process performed by the communication device shown in FIG. 4, in accordance with some embodiments.

In some embodiments, an example process 2025 of FIG. 20 (with reference to FIGS. 16D and 18) includes steps for receiving, using the antenna 1641, measured energy values corresponding to multiple antenna directions (e.g., corresponding to points of the guiding icons 1662*a-h*) around the anticipated direction 1674*a*. The steps of FIG. 20 can occur as part of step 1825 of the process 1800. With reference to FIG. 16D, at step 2025*a*, video images in a field of view of a camera 1621 of the communication device 1610 are received by the camera 1621. At step 2025*b*, an antenna direction (of the antenna 1641) is determined using sensors (e.g. the sensor module 422 of FIG. 4) of the communication device 1610.

In some embodiments, the intended transceiver is an intended satellite, and a direction towards the intended satellite is determined using known satellite parameters. If the intended satellite is a GEO satellite, the location of the intended satellite with reference to the earth coordinates is fixed. If the intended satellite is a LEO (non-GEO) satellite, location of the (moving) intended satellite is calculated based on the time of day. Then, based on GPS coordinate location information of the communication device 1610, and based on the calculated location of the intended satellite in space, an actual direction towards the intended satellite (in earth coordinates) is established. Using the antenna direction determined at step 2025*b*, a relative direction to the intended satellite is calculated with respect to the coordinates of the communication device 1610. The relative direction can include an angle between the antenna 1641 boresight and the actual direction towards the intended satellite. The relative direction can be used, in some embodiments, to display an icon on the display screen 1623 that represents a direction to the intended satellite.

At step 2025*c*, the video images, an antenna direction indicator 1661, and a guiding icon 1662*h*, are displayed on a display screen 1623 of the communication device 1610 for the user of the communication device 1610 to move the communication device 1610 to cause the antenna direction indicator 1661 and the guiding icon 1662*h* to become aligned, as described above. In some embodiments, the antenna direction indicator 1661 indicates the antenna direction relative to the field of view of the camera 1621, and the guiding icon 1662*h* represents a directional offset from the anticipated direction 1674*a*. In some embodiments, additional icons are displayed on the display screen 1623 to represent the desired direction 1673 and/or an estimated direction towards the intended transceiver. In some embodiments, the camera is not used, and video images are not displayed. At step 2025*d*, an energy value of a signal received from the intended transceiver is determined using the antenna 1641. Then, at step 2025*e*, a position of the guiding icon 1662*h* is updated on the display screen (e.g. to 1662*a*) based on the anticipated direction 1674*a*, and the process 2025 is repeated for each of the multiple antenna directions (e.g., for each point of the guiding icons 1662*a-h*), thereby producing each of the measured energy values.

Figure 21:
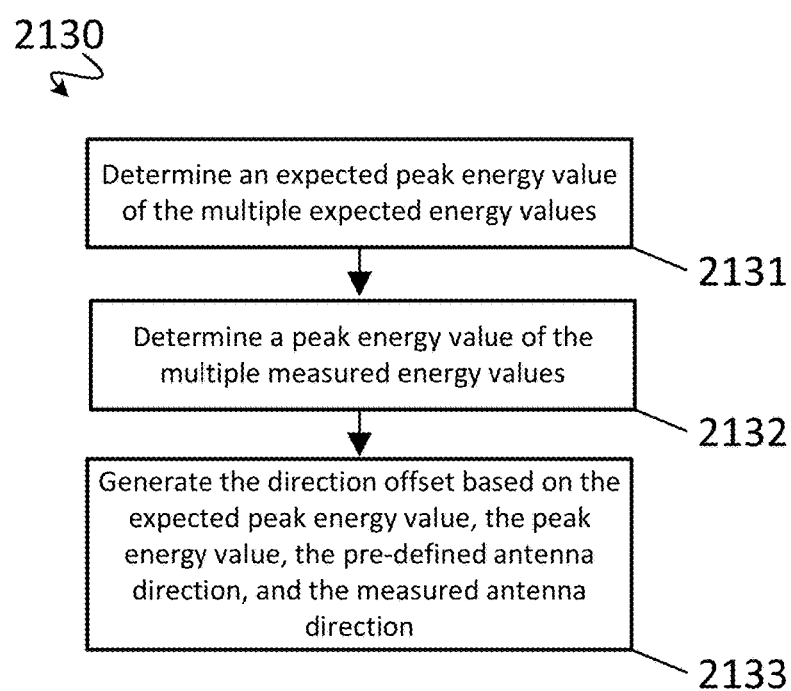
FIG. 21 is a simplified flowchart of an example process performed by the communication device shown in FIG. 4, in accordance with some embodiments.

In accordance with a first embodiment, an example process 2130 of FIG. 21 includes steps for calculating a directional offset using the expected energy parameters, the measured energy values, the pre-defined antenna directions, and the measured antenna directions. The steps of FIG. 21 can occur as part of step 1830 of the process 1800 discussed with reference to FIG. 18. At step 2131, an expected extremum energy value of the multiple expected energy values is determined. In some embodiments, the expected extremum energy value corresponds to a pre-defined antenna direction of the multiple pre-defined antenna directions. At step 2132, an extremum energy value of the multiple measured energy values (e.g. the measured energy values 1721 of FIG. 17B) is determined. In some embodiments, the extremum energy value corresponds to a measured antenna direction of the multiple measured antenna directions. Then, at step 2133, the directional offset is generated based on the expected extremum energy value, the extremum energy value, the corresponding pre-defined antenna direction, and the corresponding measured antenna direction.

In some embodiments, the angle corresponding to a minimum energy peak value may be used in a similar way, or in addition to the use of a maximum peak energy value. While calculations based on the extremum energy values facilitates the pointing of the antenna in the desired direction, these calculations may not, in some embodiments, determine how far the antenna should be pointed along that direction. In some embodiments, the determination of how "far" along the desired direction (e.g. to what extent) the antenna should be pointed is determined using the maximum peak energy value and the value of the minimum received energy values. In accordance with some embodiments, a ratio between the maximum and minimum received energy values is determined and that (received) ratio is compared to an expected ratio. If the received ratio is greater than the expected ratio, the antenna may be pointing too far from the intended satellite and needs to be moved closer (along the direction which was determined based on the max/min values).

Figure 22:
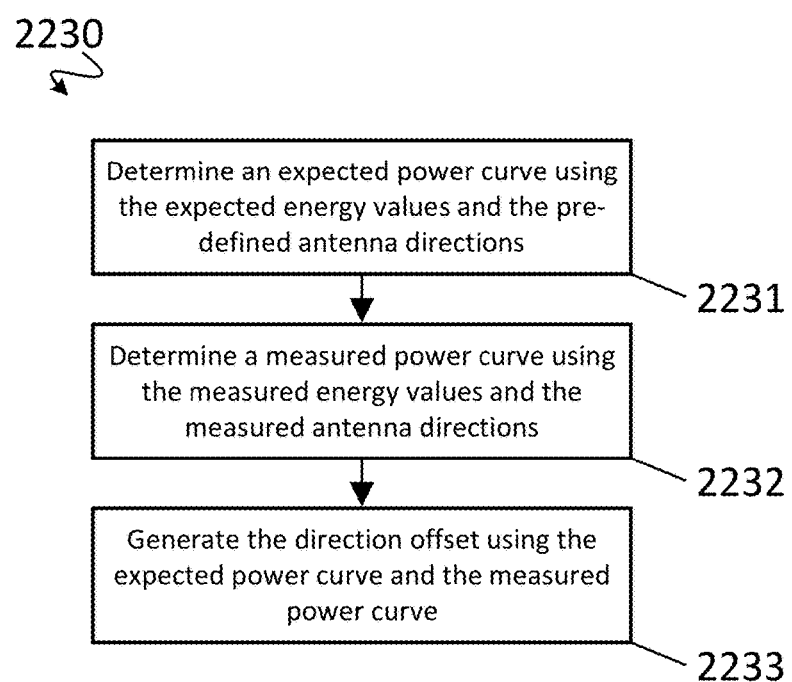
FIG. 22 is a simplified flowchart of an example process performed by the communication device shown in FIG. 4, in accordance with some embodiments.

In accordance with a second embodiment, an example process 2230 of FIG. 22 includes steps for calculating a directional offset using the expected energy parameters, the measured energy values, the pre-defined antenna directions, and the measured antenna directions. The steps of FIG. 22 can occur as part of step 1830 of the process 1800 discussed with reference to FIG. 18. At step 2231, an expected power curve is determined using the expected energy values and the pre-defined antenna directions. At step 2232, a measured power curve is determined using the measured energy values and the measured antenna directions. Then, at step 2233, the directional offset is generated using the expected power curve and the measured power curve. In some embodiments, determining the measured power curve includes fitting a distorted sinusoid to the multiple measured energy values.

Figure 23:
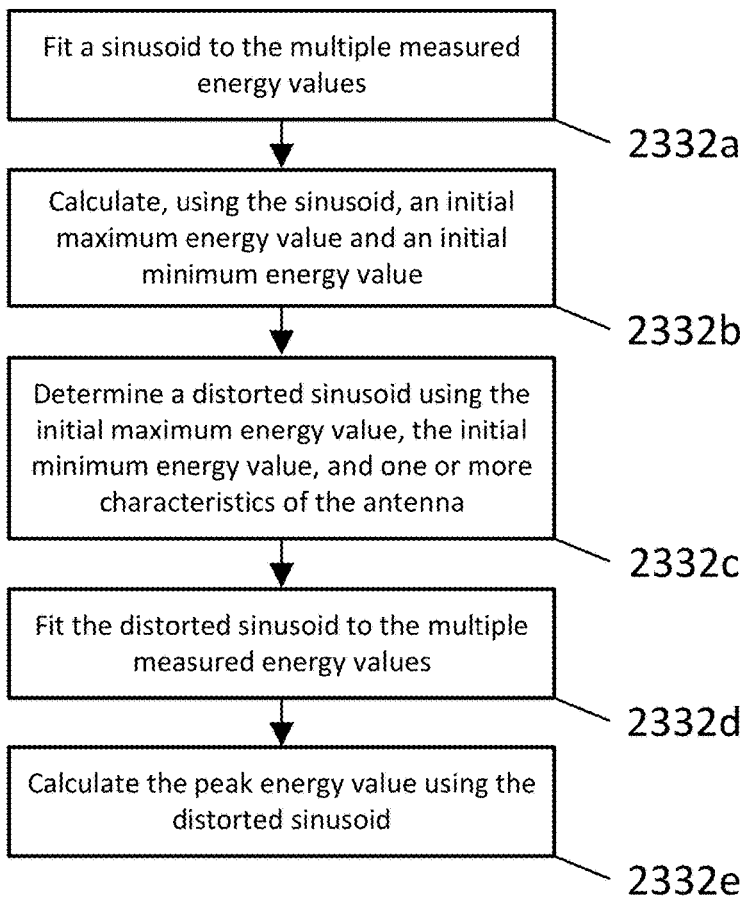
FIG. 23 is a simplified flowchart of an example process performed by the communication device shown in FIG. 4, in accordance with some embodiments.

In some embodiments, an example process 2332 of FIG. 23 includes steps for determining a peak energy value corresponding to the multiple measured energy values. The steps of FIG. 23 can occur as part of step 2132 of process 2130 discussed with reference to FIG. 21. At step 2332*a*, a sinusoid is fitted to the multiple measured energy values. At step 2332*b*, an initial maximum energy value and an initial minimum energy value are calculated using the sinusoid. At step 2332*c*, a distorted sinusoid is determined using the initial maximum energy value, the initial minimum energy value, and one or more characteristics of the antenna. At step 2332*d*, the distorted sinusoid is fitted to the multiple measured energy values. Then, at step 2332*e*, the peak energy value is calculated using the distorted sinusoid.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   (a) determining, by a communication device having an antenna, a direction to an intended transceiver, the direction being substantially in an actual direction to the intended transceiver;
   (b) determining, by the communication device, a desired direction that is different from the direction to the intended transceiver;
   (c) determining by the communication device, an anticipated direction to the desired direction;
   (d) determining, by the communication device and based on the desired direction, parameters of expected energy values corresponding to a plurality of pre-defined antenna directions of the antenna around the desired direction;
   (e) receiving, by the communication device using the antenna, a plurality of measured energy values corresponding to a plurality of antenna directions of the antenna around the anticipated direction;
   (f) calculating, by the communication device, a directional offset using the parameters of expected energy values and the plurality of measured energy values;
   (g) generating, by the communication device, an updated anticipated direction by updating the anticipated direction based on the calculated directional offset; and
   (h) repeating steps (e) through (g) using the updated anticipated direction as the anticipated direction.

2. The method of claim 1, wherein the determining of (b) comprises:
   determining, based on a prospective antenna direction, that a first link budget between the communication device and the intended transceiver is greater than a first predetermined threshold value;

determining, based on the prospective antenna direction, that a second link budget between the communication device and an unintended receiver is less than a second predetermined threshold value; and using the prospective antenna direction as the desired direction.

3. The method of claim 2, wherein the prospective antenna direction is calculated using: (i) a direction to the intended transceiver relative to a boresight of the antenna, (ii) a direction to the unintended receiver relative to the boresight of the antenna, (iii) characteristics of the intended transceiver, (iv) characteristics of the unintended receiver, (v) a direction in which the antenna of the intended transceiver points, and (vi) a direction in which the antenna of the unintended receiver points.

4. The method of claim 1, wherein the determining of (d) comprises:

for each antenna direction of the plurality of pre-defined antenna directions, determining an expected link budget value using: (i) that antenna direction, (ii) characteristics of the intended transceiver, (iii) characteristics of the antenna of the intended transceiver, and (iv) characteristics of the antenna of the communication device.

5. The method of claim 4, wherein:

the characteristics of the intended transceiver include one or more of: (i) a position of the intended transceiver relative to the communication device, (ii) a gain pattern of an antenna of the intended transceiver, and (iii) transmission signal power of the intended transceiver; and the characteristics of the antenna of the communication device include one or more of: (i) a gain pattern of the antenna, and (ii) antenna lobe characteristics of the antenna.

6. The method of claim 1, further comprising:

before (b), waiting until the communication device has data to transmit before proceeding to (b).

7. The method of claim 1, wherein the receiving of (e) comprises:

receiving, by the communication device using a camera of the communication device, video images in a field of view of the camera;

determining, by the communication device using sensors of the communication device, an antenna direction of the antenna;

displaying, by the communication device using a display screen of the communication device, (i) the video images, (ii) an antenna direction indicator, and (iii) a guiding icon, wherein the antenna direction indicator indicates the antenna direction relative to the field of view of the camera, and the guiding icon represents an offset from the anticipated direction;

determining, by the communication device using the antenna, an energy value of a signal received from the intended transceiver; and updating, by the communication device, a position of the guiding icon on the display screen based on the anticipated direction.

8. The method of claim 1, wherein the determining of (f) comprises:

determining an expected extremum energy value of the parameters of expected energy values, the expected extremum energy value corresponding to a pre-defined antenna direction of the plurality of pre-defined antenna directions;

determining an extremum energy value of the plurality of measured energy values, the extremum energy value corresponding to a measured antenna direction of the plurality of measured antenna directions; and generating the directional offset based on the expected extremum energy value, the extremum energy value, the pre-defined antenna direction, and the measured antenna direction.

9. The method of claim 8, wherein the determining of the extremum energy value of the plurality of measured energy values comprises:

fitting a sinusoid to the plurality of measured energy values;

calculating, using the sinusoid, an initial maximum energy value and an initial minimum energy value;

determining a distorted sinusoid using the initial maximum energy value, the initial minimum energy value, and one or more characteristics of the antenna;

fitting the distorted sinusoid to the plurality of measured energy values; and calculating the extremum energy value using the distorted sinusoid.

10. The method of claim 1, wherein the determining of (f) comprises:

determining an expected power curve using the parameters of expected energy values and the plurality of pre-defined antenna directions;

determining a measured power curve using the plurality of measured energy values and the plurality of measured antenna directions; and generating the directional offset using the expected power curve and the measured power curve.

11. The method of claim 10, wherein determining a measured power curve comprises fitting a distorted sinusoid to the plurality of measured energy values.

12. The method of claim 1, further comprising:

determining an extremum energy value;

determining an angle associated with the extremum energy value;

determining a maximum received energy value;

determining a minimum received energy value; and determining a ratio between the maximum received energy value and the minimum received energy value;

wherein the parameters of expected energy values at (f) comprise the determined extremum energy value, the determined angle, and the determined ratio.

13. A communication device comprising:

an antenna that receives a signal from an intended source;

a receiver module coupled to the antenna to receive and process the signal;

a sensor module to determine directional and position information of the communication device;

a memory that stores instructions; and a processor coupled to the receiver module, the sensor module, and the memory and configured to execute the instructions;

wherein the instructions, when executed by the processor, cause the processor to execute a method comprising:

(a) determining, using the receiver module and the sensor module, a direction to an intended transceiver, the direction being substantially in an actual direction to the intended transceiver;

(b) determining a desired direction that is different from the direction to the intended transceiver;

(c) determining an anticipated direction to the desired direction;

(d) determining, based on the desired direction, parameters of expected energy values corresponding to a plurality of pre-defined antenna directions of the antenna around the desired direction;

(e) receiving, by the communication device using the receiver module, a plurality of measured energy values corresponding to a plurality of antenna directions of the antenna around the anticipated direction, each measured antenna direction of the plurality of antenna directions being measured using the sensor module;

(f) calculating a directional offset using the parameters of expected energy values and the plurality of measured energy values;

(g) generating an updated anticipated direction by updating the anticipated direction based on the calculated directional offset; and (h) repeating steps (e) through (g) using the updated anticipated direction as the anticipated direction.

14. The communication device of claim 13, wherein the determining of (b) comprises:
determining, based on a prospective antenna direction, that a first link budget between the communication device and the intended transceiver is greater than a first predetermined threshold value;
determining, based on the prospective antenna direction, that a second link budget between the communication device and an unintended receiver is less than a second predetermined threshold value; and
using the prospective antenna direction as the desired direction.

15. The communication device of claim 14, wherein the prospective antenna direction is calculated using: (i) a direction to the intended transceiver relative to a boresight of the antenna, (ii) a direction to the unintended receiver relative to the boresight of the antenna, (iii) characteristics of the intended transceiver, (iv) characteristics of the unintended receiver, (v) a direction in which the antenna of the intended transceiver points, and (vi) a direction in which the antenna of the unintended receiver points.

16. The communication device of claim 13, wherein the determining of (d) comprises:
for each antenna direction of the plurality of pre-defined antenna directions of the communication device, determining an expected link budget value using: (i) that antenna direction, (ii) characteristics of the intended transceiver, (iii) characteristics of the antenna of the intended transceiver, and (iv) characteristics of the antenna of the communication device.

17. The communication device of claim 16, wherein:
the characteristics of the intended transceiver include one or more of: (i) a position of the intended transceiver relative to the communication device, (ii) a gain pattern of an antenna of the intended transceiver, and (iii) transmission signal power of the intended transceiver; and
the characteristics of the antenna include one or more of: (i) a gain pattern of the antenna, and (ii) antenna lobe characteristics of the antenna.

18. The communication device of claim 13, further comprising:
a display screen coupled to the processor; and
a camera coupled to the display screen;
wherein the receiving of (e) comprises:
receiving, using the camera, video images in a field of view of the camera;
determining, using the sensor module, an antenna direction;
displaying, using the display screen, (i) the video images, (ii) an antenna direction indicator, and (iii) a guiding icon, wherein the antenna direction indicator indicates the antenna direction relative to the field of view of the camera, and the guiding icon represents an offset from the anticipated direction;
determining, using the receiver module, an energy value of a signal received from the intended transceiver; and
updating, using the display screen, a position of the guiding icon on the display screen based on the anticipated direction.

19. The communication device of claim 13, wherein the determining of (f) comprises:
determining an expected extremum energy value of the parameters of expected energy values, the expected extremum energy value corresponding to a pre-defined antenna direction of the plurality of pre-defined antenna directions;
determining an extremum energy value of the plurality of measured energy values, the extremum energy value corresponding to a measured antenna direction of the plurality of measured antenna directions; and
generating the directional offset based on the expected extremum energy value, the extremum energy value, the pre-defined antenna direction, and the measured antenna direction.

20. The communication device of claim 13, wherein the determining of (f) comprises:
determining an expected power curve using the parameters of expected energy values and the plurality of pre-defined antenna directions;
determining a measured power curve using the plurality of measured energy values and the plurality of measured antenna directions; and
generating the directional offset using the expected power curve and the measured power curve.

* * * * *